United States Patent [19]
Grant et al.

[11] Patent Number: 5,996,824
[45] Date of Patent: Dec. 7, 1999

[54] DOUBLE ORIFICE CONTAINER

[76] Inventors: Chris J. Grant; Gary Dean Meyer, both of 12 Whitestile Road, Brentford, Middlesex TW8 9NJ, United Kingdom

[21] Appl. No.: 08/716,349

[22] PCT Filed: May 1, 1995

[86] PCT No.: PCT/GB95/00995

§ 371 Date: Sep. 27, 1996

§ 102(e) Date: Sep. 27, 1996

[87] PCT Pub. No.: WO95/29806

PCT Pub. Date: Nov. 9, 1995

[30] Foreign Application Priority Data

Apr. 29, 1994 [GB] United Kingdom .................... 9408541
Sep. 21, 1994 [GB] United Kingdom .................... 9418978

[51] Int. Cl.⁶ ...................................................... B65D 1/06
[52] U.S. Cl. .............................. 215/2; 215/237; 222/184; 222/212; 222/482
[58] Field of Search ............................... 215/2, 235, 237; 222/206, 212, 213, 215, 92, 107, 184, 482

[56] References Cited

U.S. PATENT DOCUMENTS

| | | |
|---|---|---|
| 3,357,046 | 12/1967 | Pechthold . |
| 4,005,966 | 2/1977 | Nutting . |
| 4,054,017 | 10/1977 | Naumann . |
| 4,629,081 | 12/1986 | McLaren ................................ 215/206 |
| 4,782,964 | 11/1988 | Poore et al. ............................ 215/216 |
| 4,940,167 | 7/1990 | Fillmore et al. ........................ 222/153 |
| 5,031,784 | 7/1991 | Wright .................................... 215/216 |
| 5,078,286 | 1/1992 | Hashimoto ............................ 215/2 X |
| 5,409,124 | 4/1995 | Nasrallah ............................... 215/2 X |
| 5,609,266 | 3/1997 | Nakazato et al. ...................... 220/703 |

FOREIGN PATENT DOCUMENTS

| | | |
|---|---|---|
| 2.185.539 | 4/1974 | France . |
| 2012365 | 10/1970 | Germany . |
| 3033821 A1 | 8/1982 | Germany . |
| 3141069 A1 | 5/1983 | Germany . |

*Primary Examiner*—Stephen K. Cronin
*Attorney, Agent, or Firm*—Westman, Champlin & Kelly, P.A.

[57] ABSTRACT

There is described a container for storing and/or dispensing a substance, the container (10) defining a dispensing orifice (13) and a filling orifice (14) spaced from said dispensing orifice (13), the filling orifice (14) being recessed into the container (10) and permanently sealed following the introduction into the container (10) of the substance to be stored and/or dispensed. There is also described a closure for a container (10), the closure defining a dispensing orifice (13) and comprising a closure means (11) flexibly hinged to the closure for movement between an open position and a closed position in which the closure means (11) closes the dispensing orifice (13), and a projecting portion provided on one of the closure or closure means and adapted so as to be progressively received within an opening (30) provided in the other of the closure and closure means (11) as the closure means (11) is moved towards said closed position, the projecting portion so engaging the means defining the opening as to prevent the closure means from moving from said open position to said closed position as the container is filled. There is also described a closure for a container, the closure defining a dispensing orifice (13) and comprising a closure means (11) for closing the dispensing orifice (13) and a tear tab (23) formed integrally with the closure and connected thereto by a frangible tear point (29), the tear tab (23) being so arranged as to partially overlie a surface of the closure means (11) when said closure means (11) is in said closed position thereby enabling the tear tab (23) to be joined to the closure means (11) to secure the closure means (11) in said closed position, the tear tab (23) being further joined to the closure by a frangible manufacturing support (35) adjacent the portion which in use is joined to the closure means (11).

20 Claims, 36 Drawing Sheets

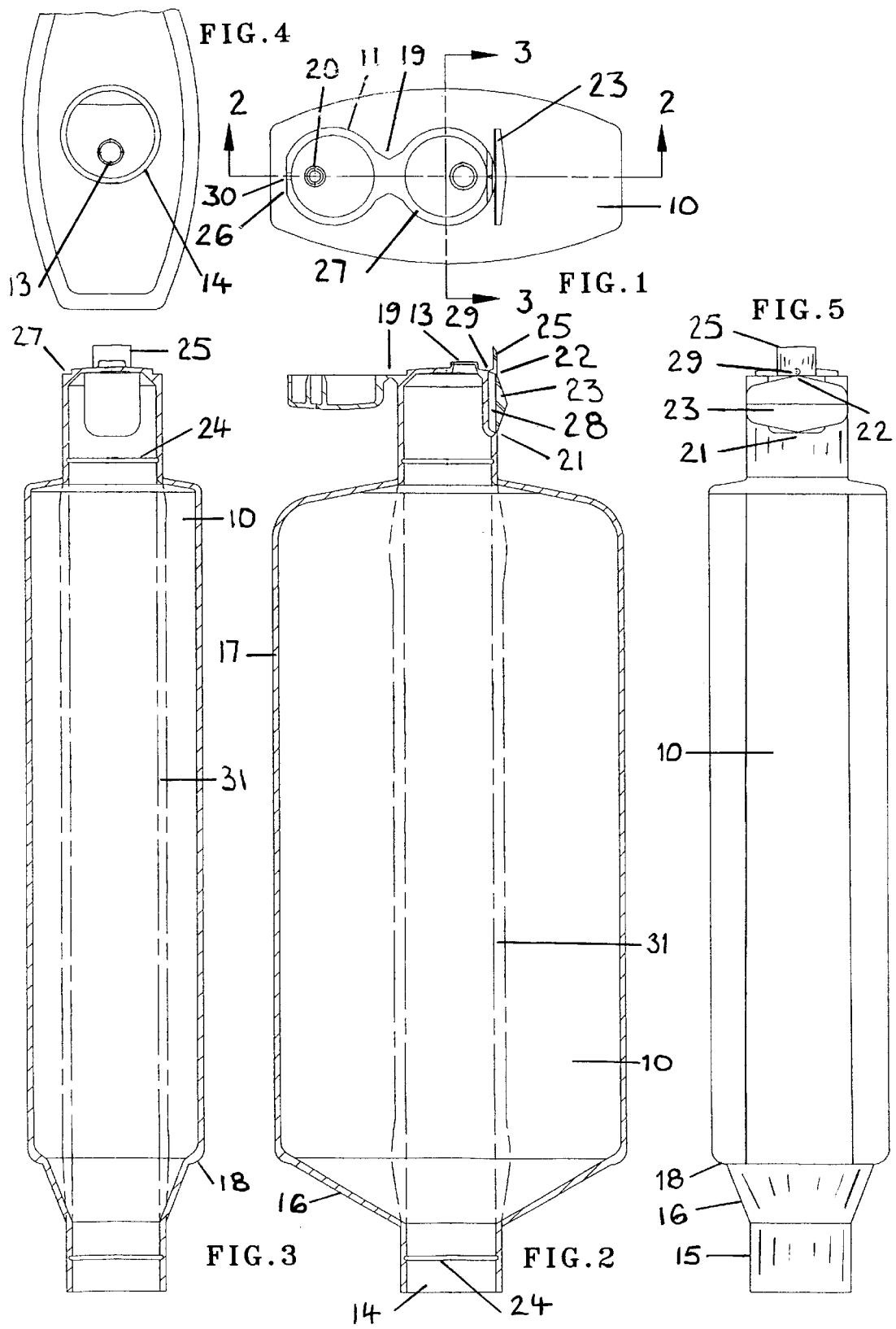

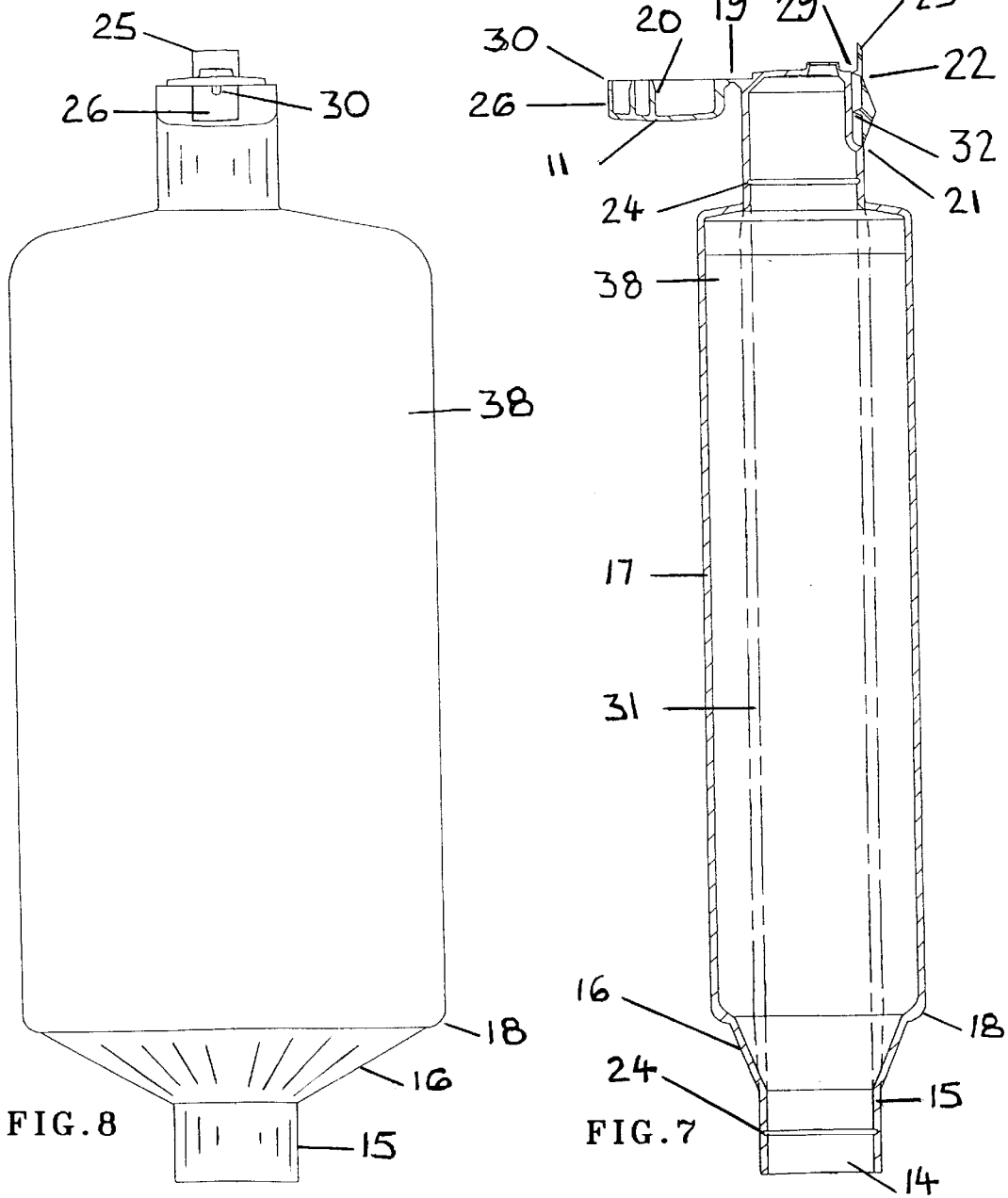

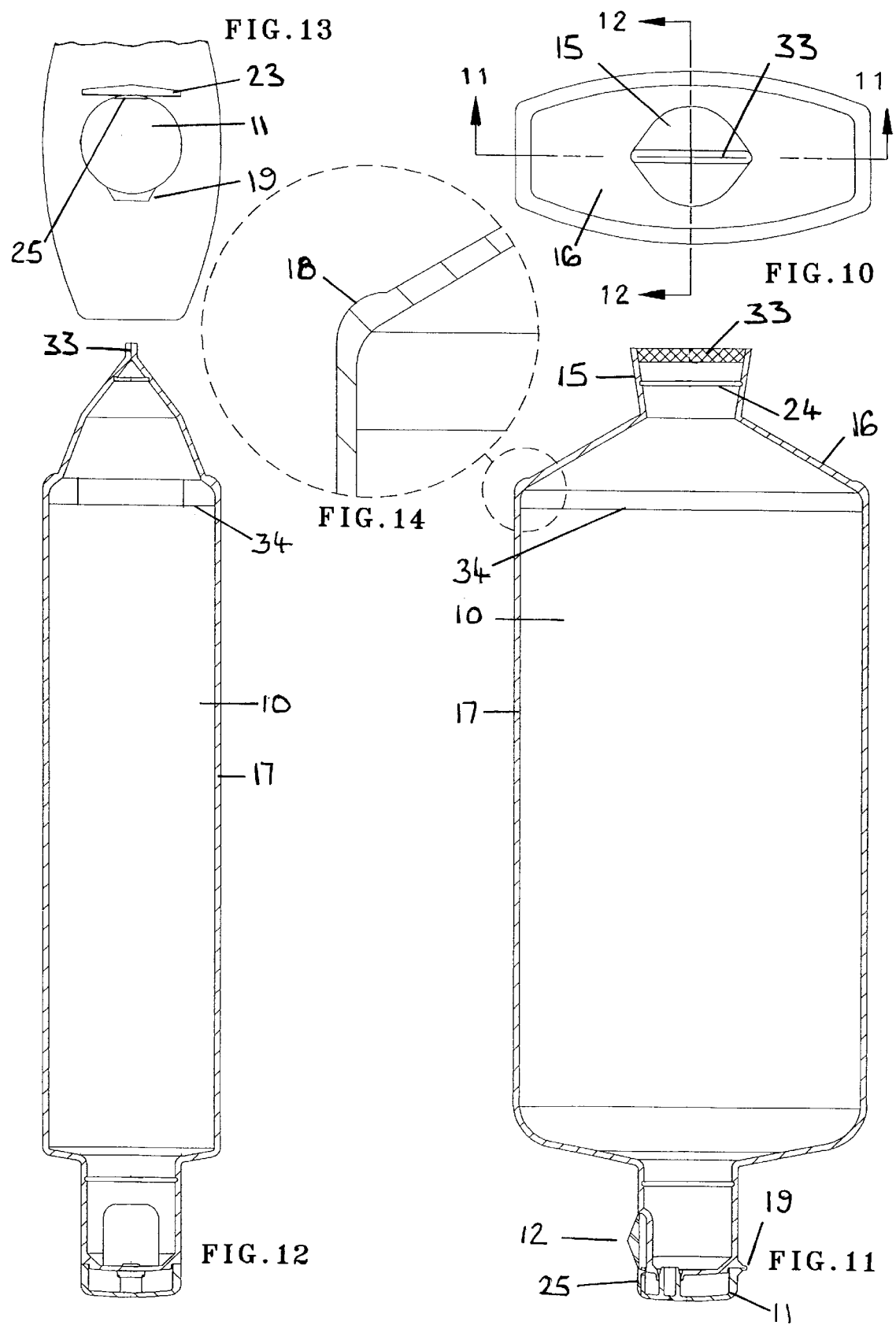

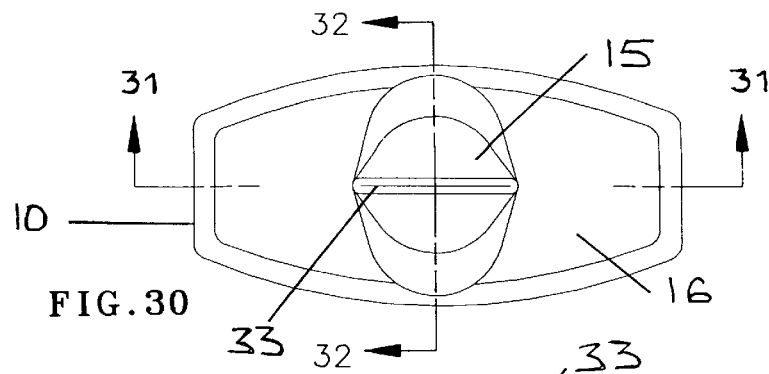
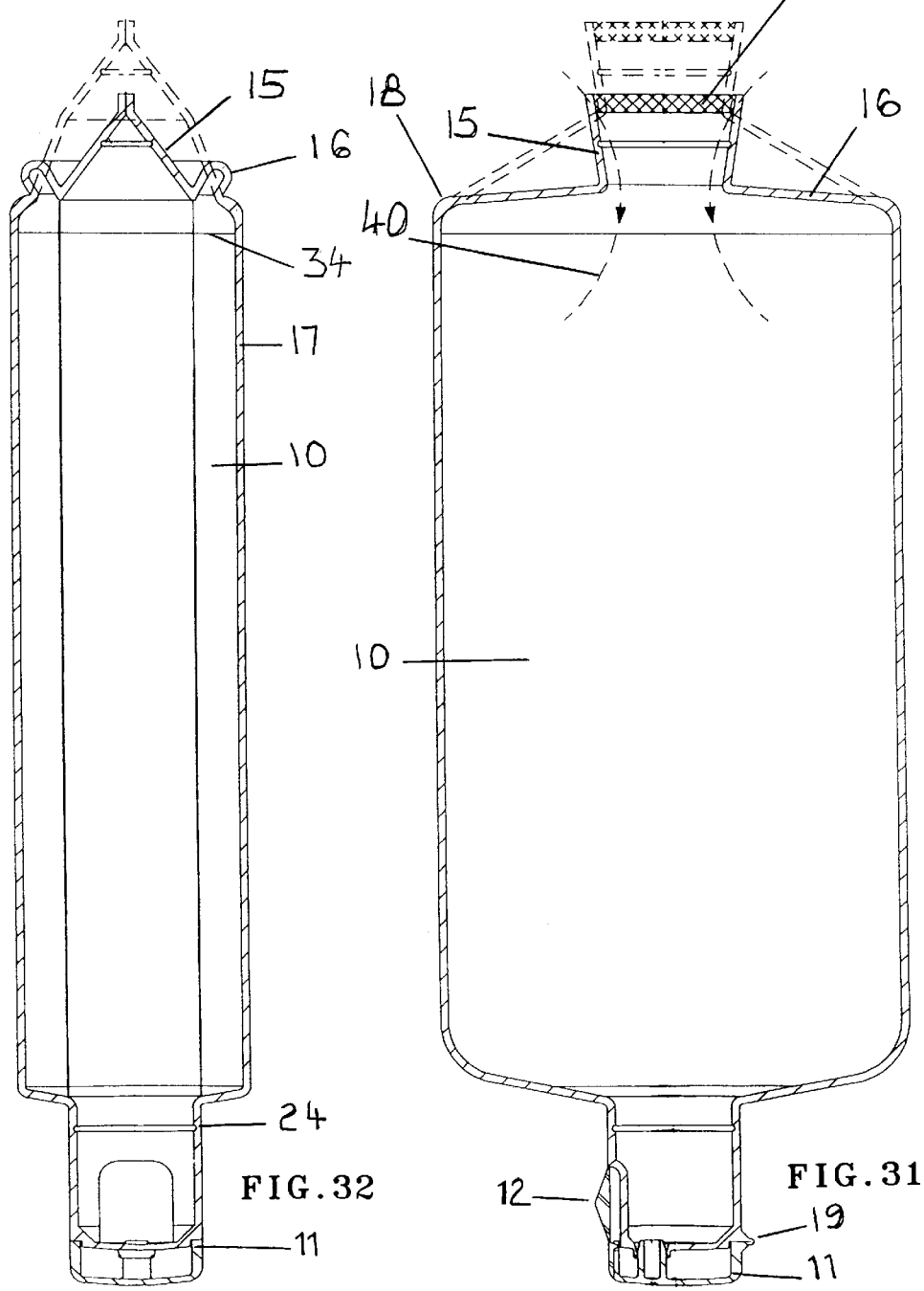

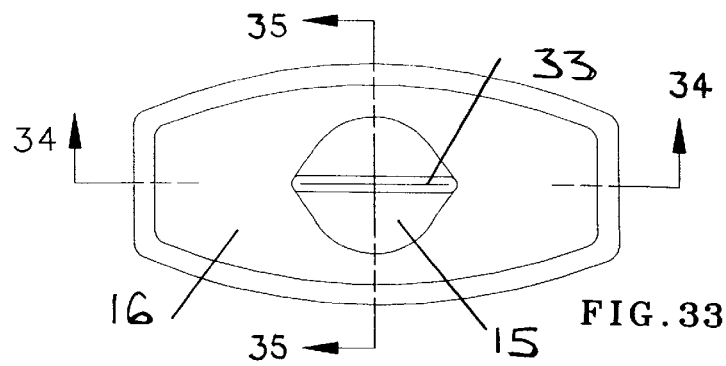
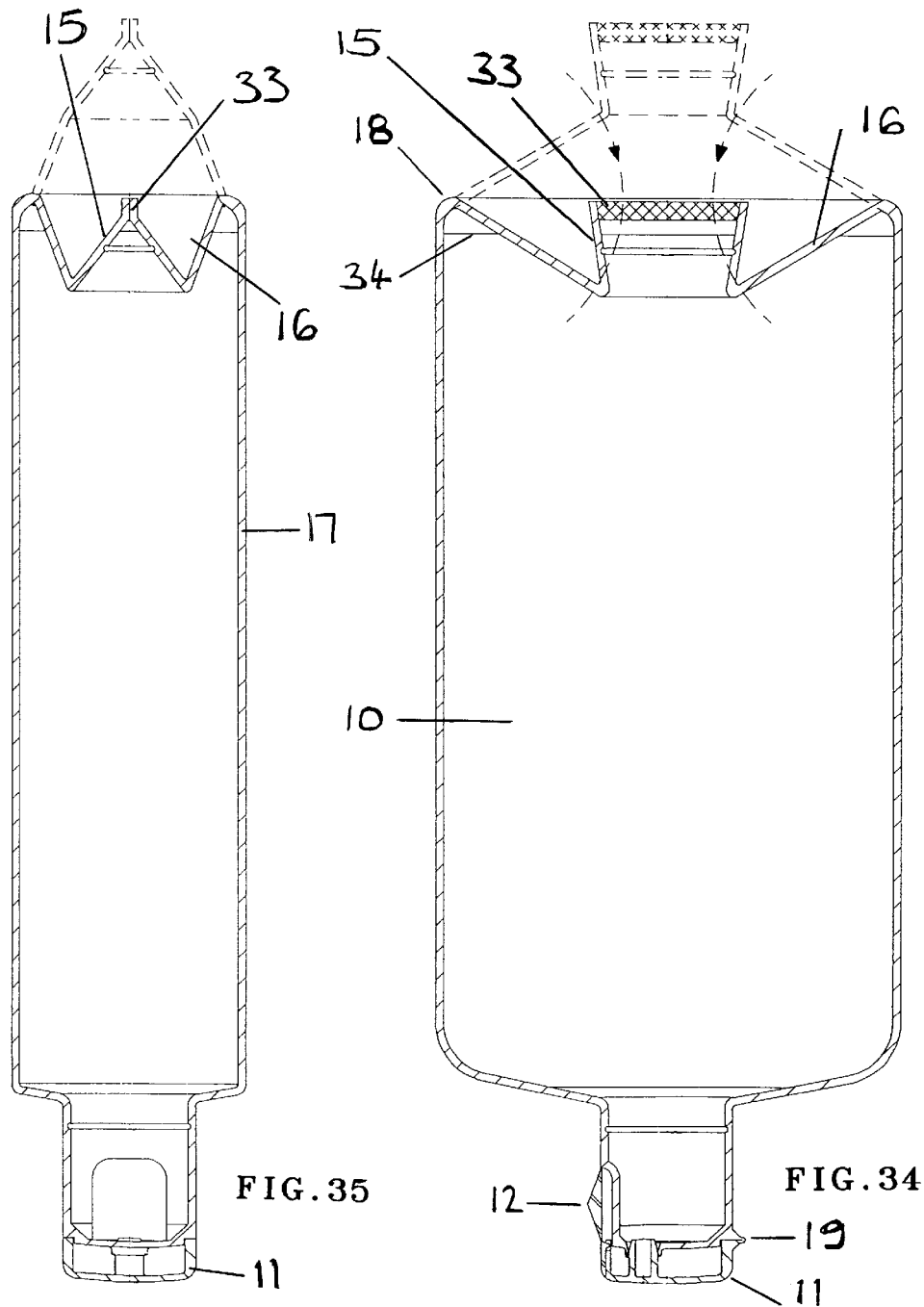

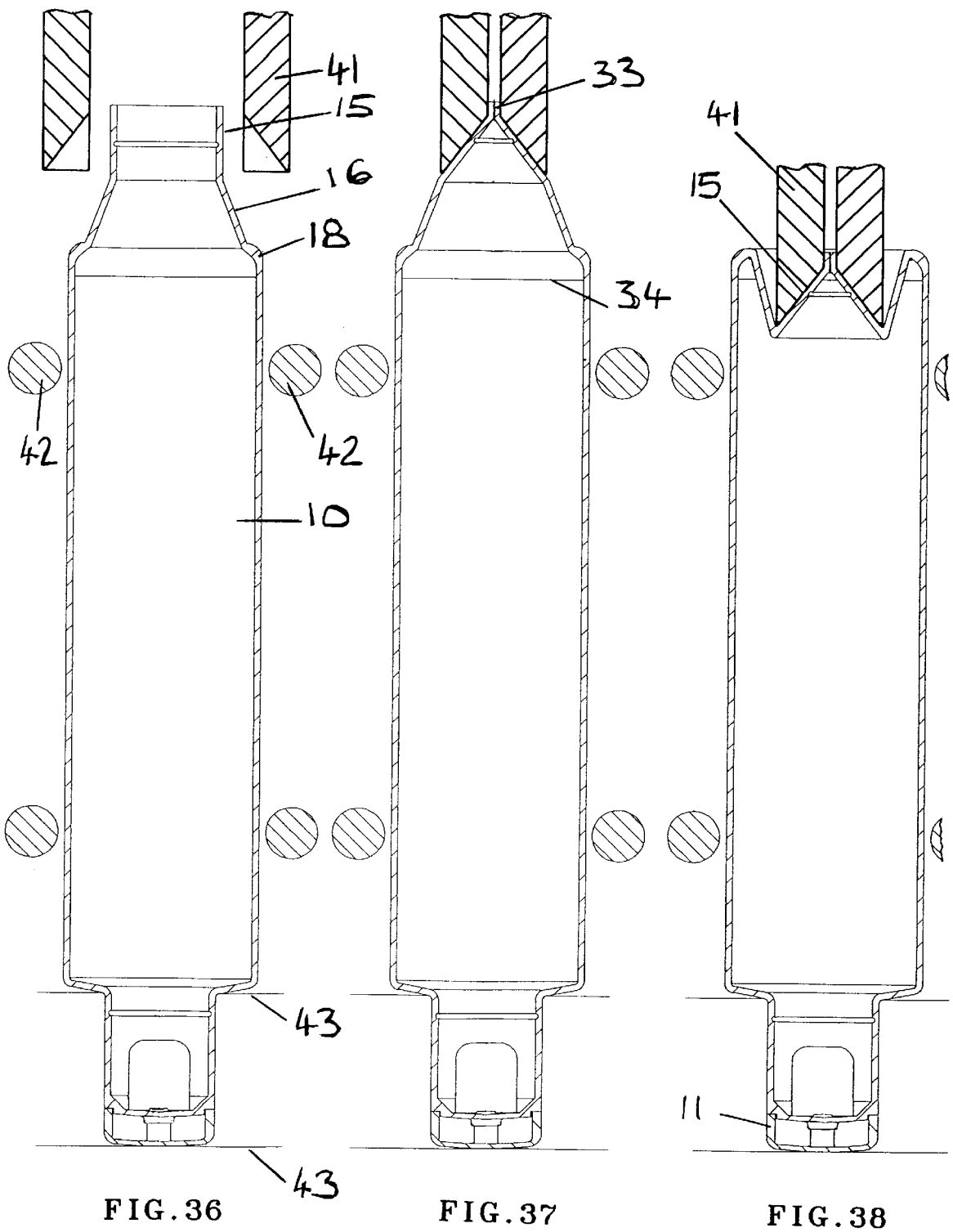

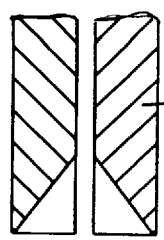
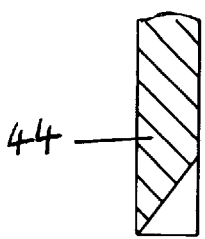
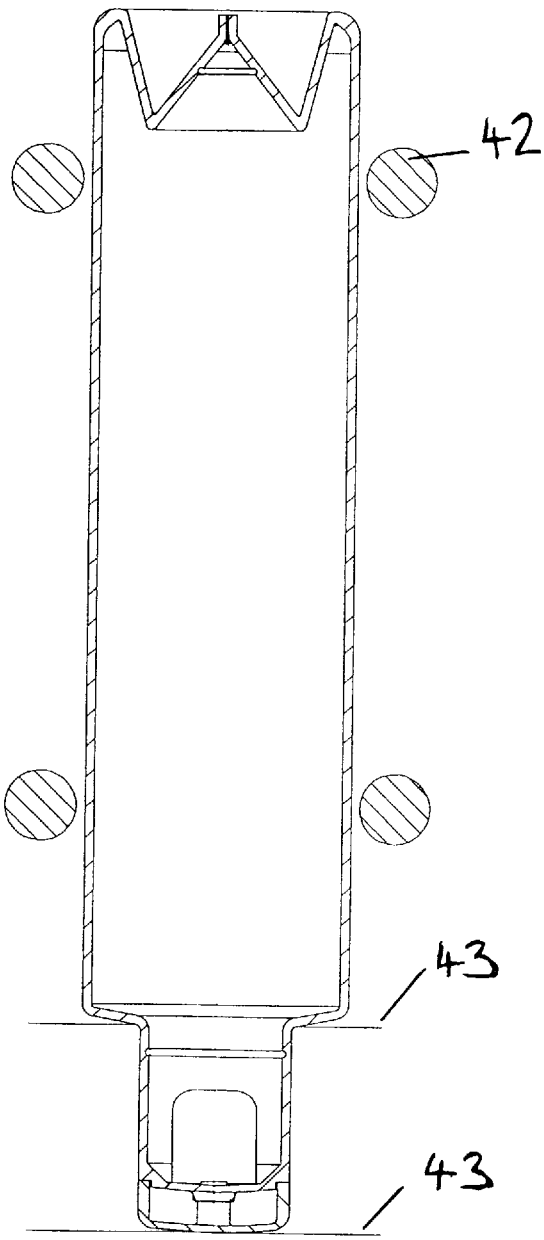
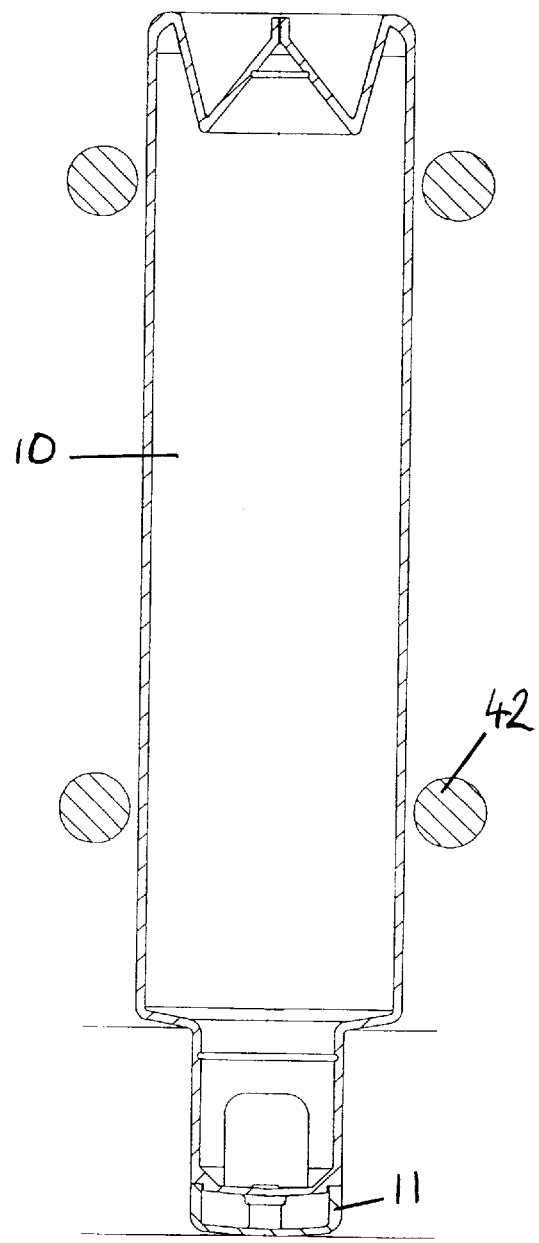
FIG. 39
FIG. 40

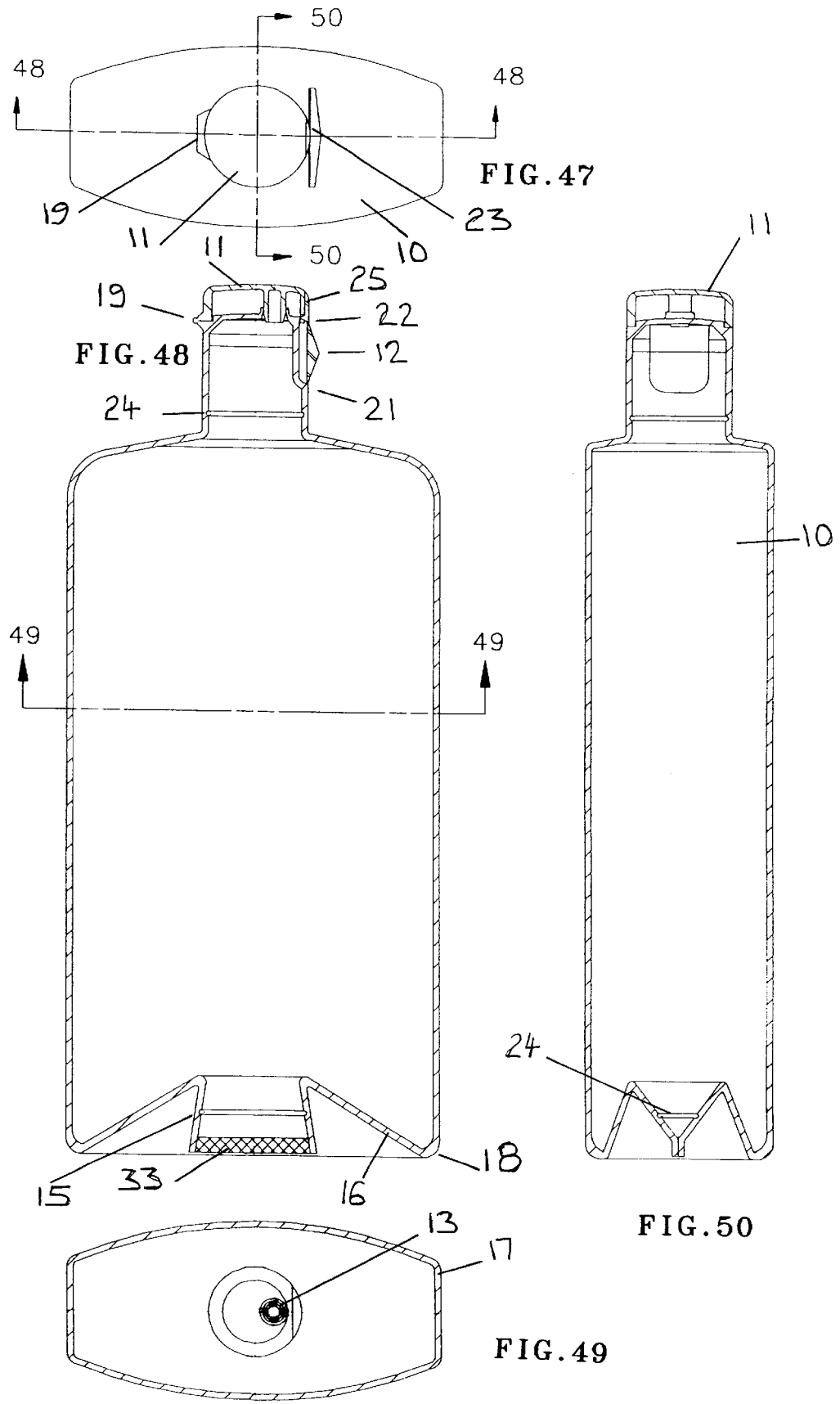

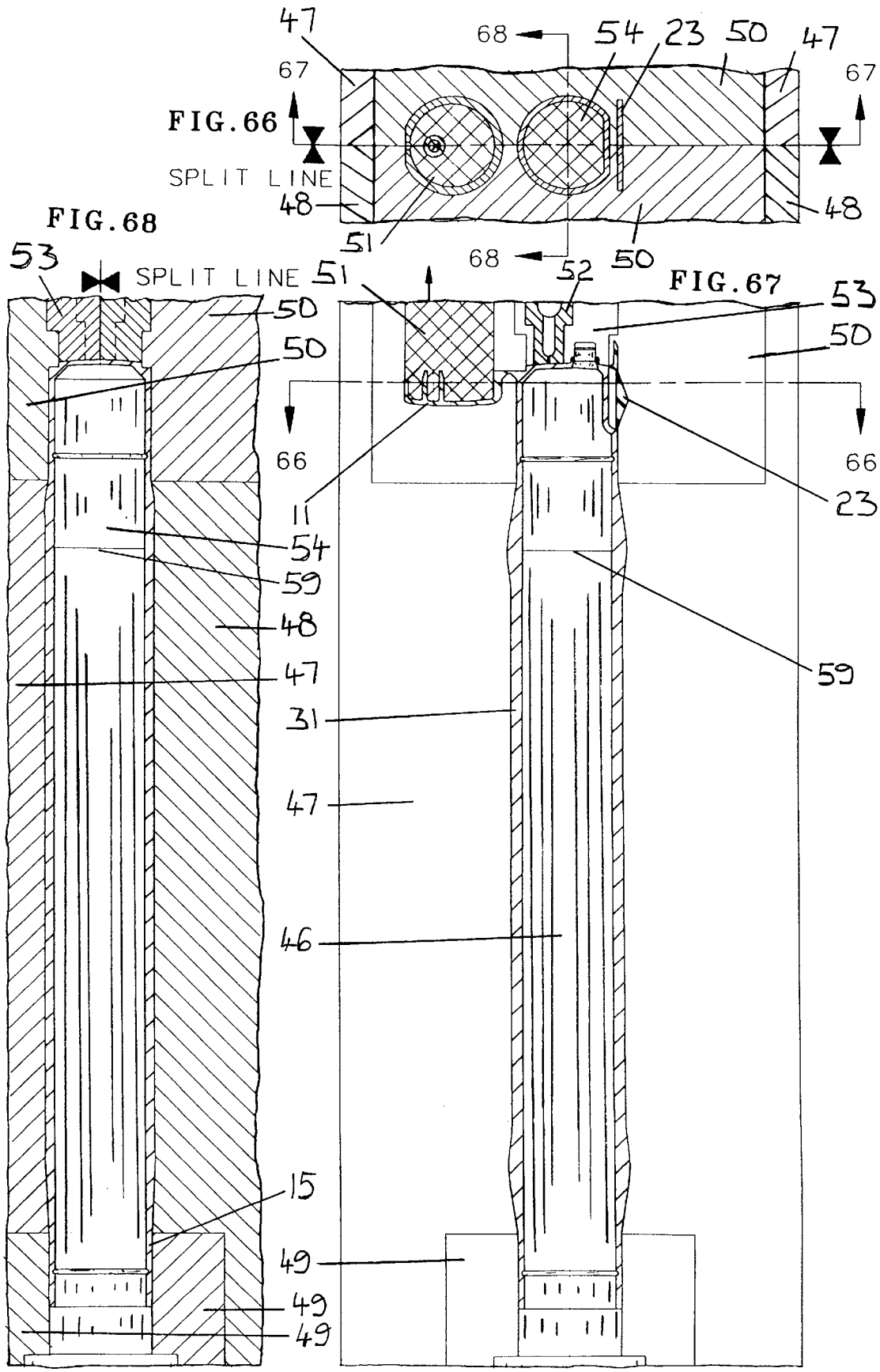

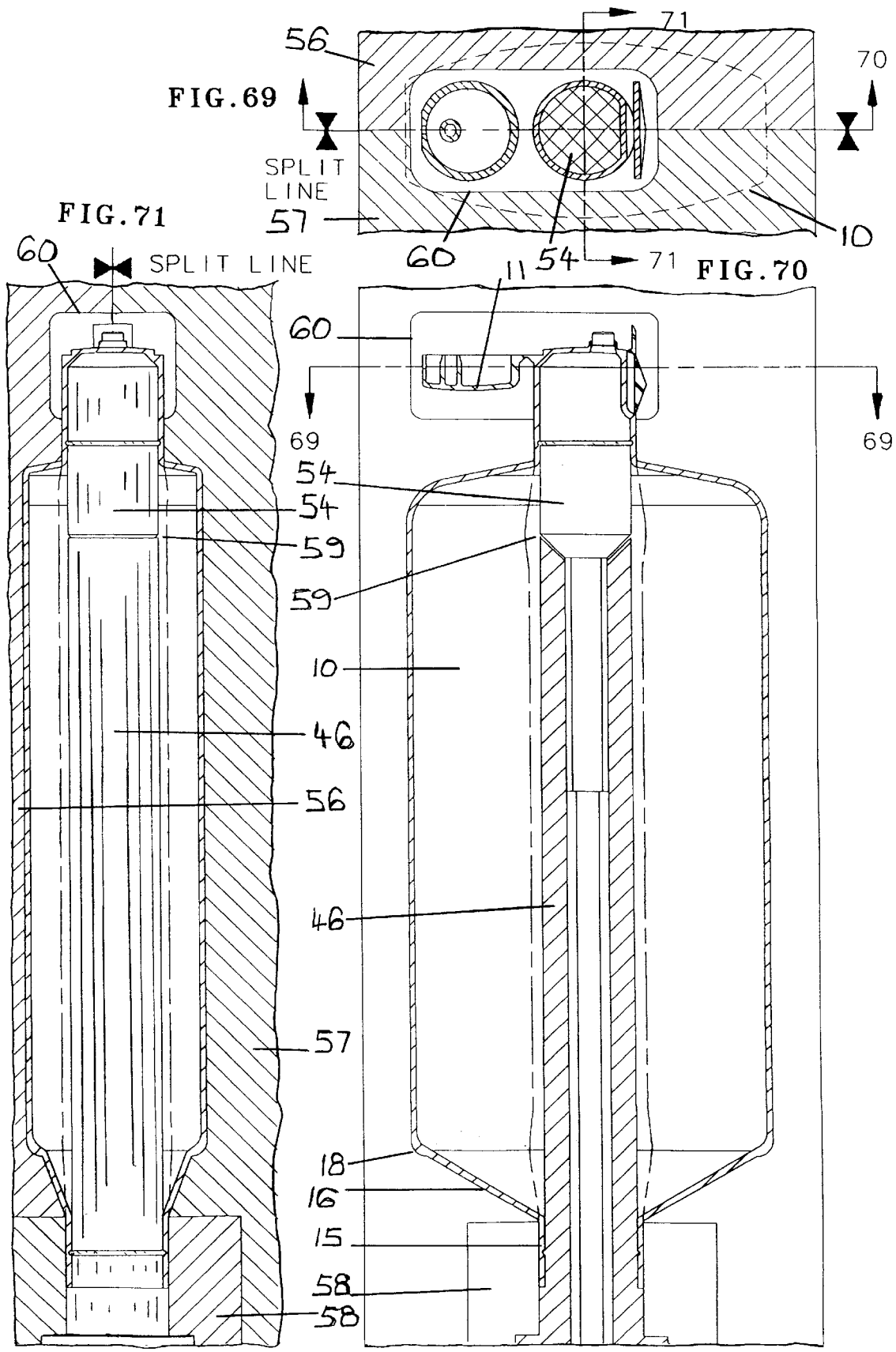

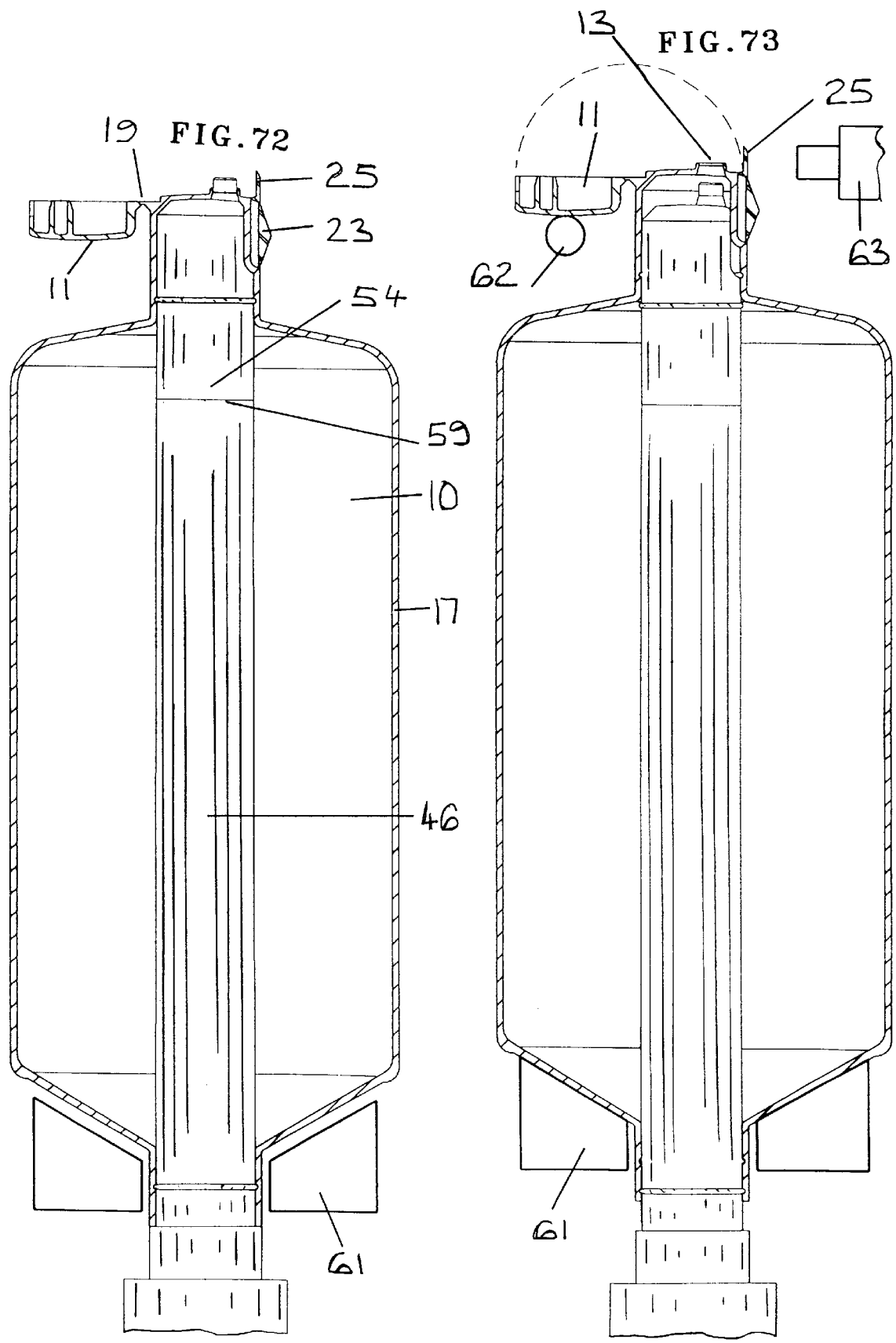

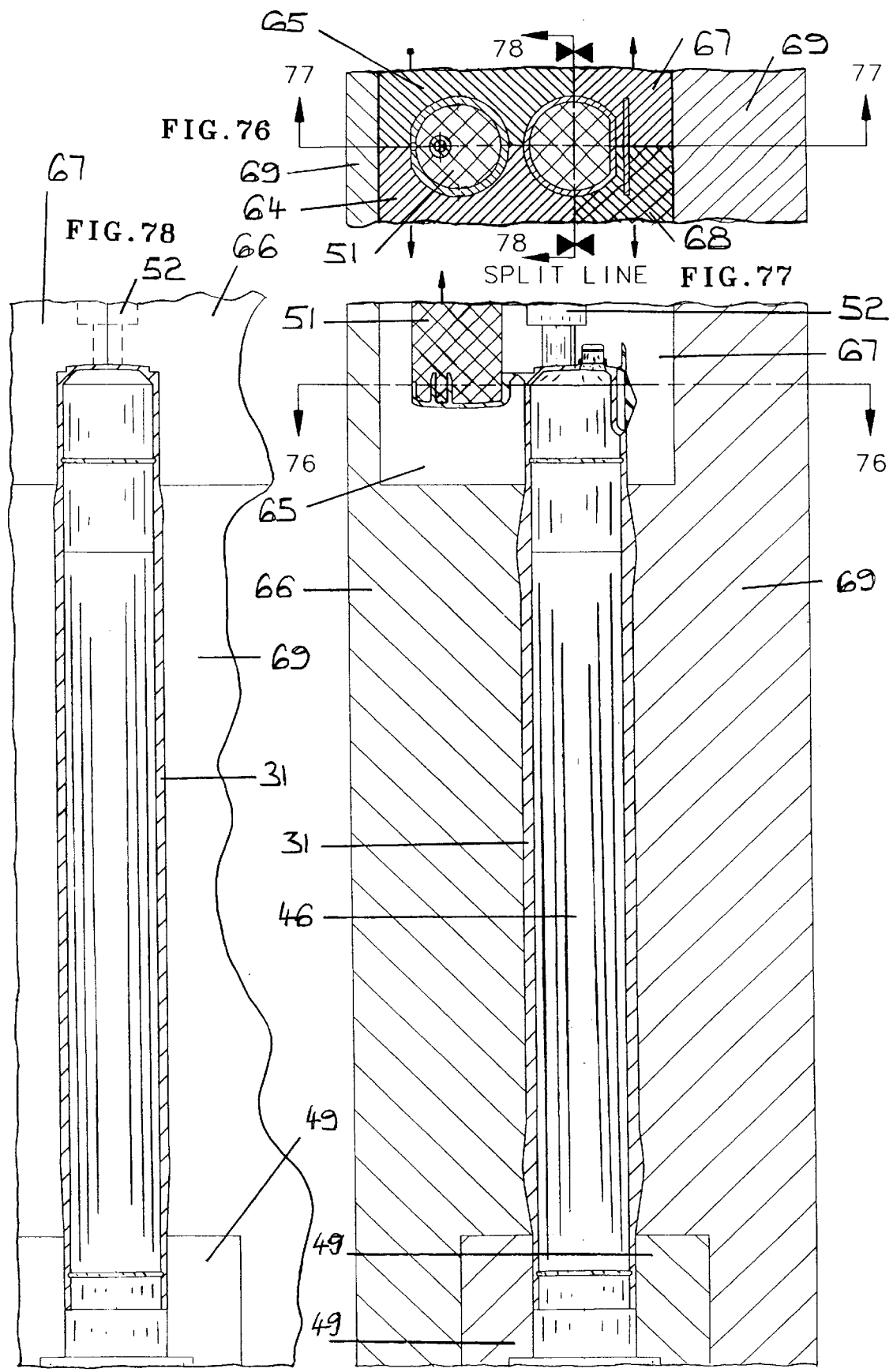

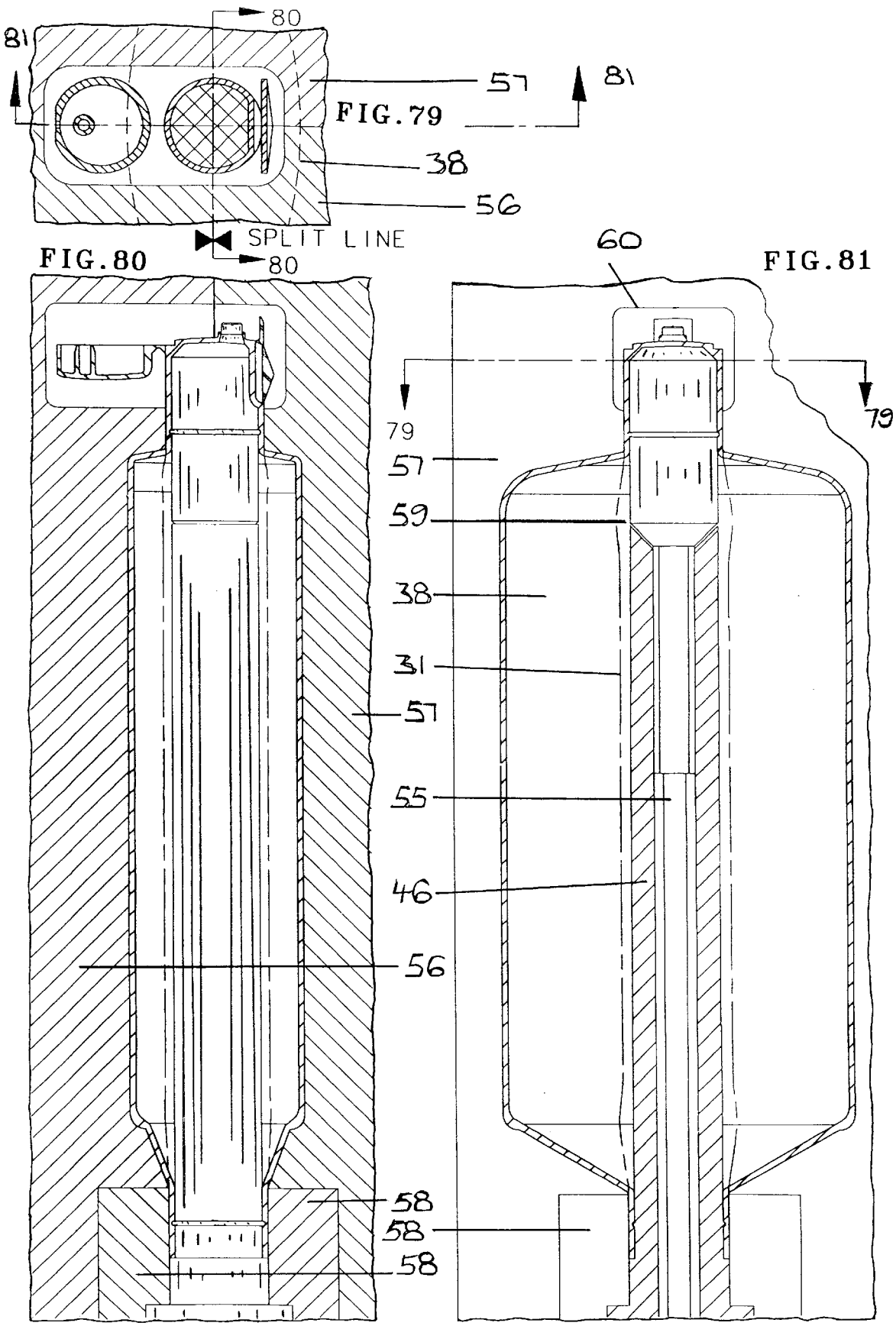

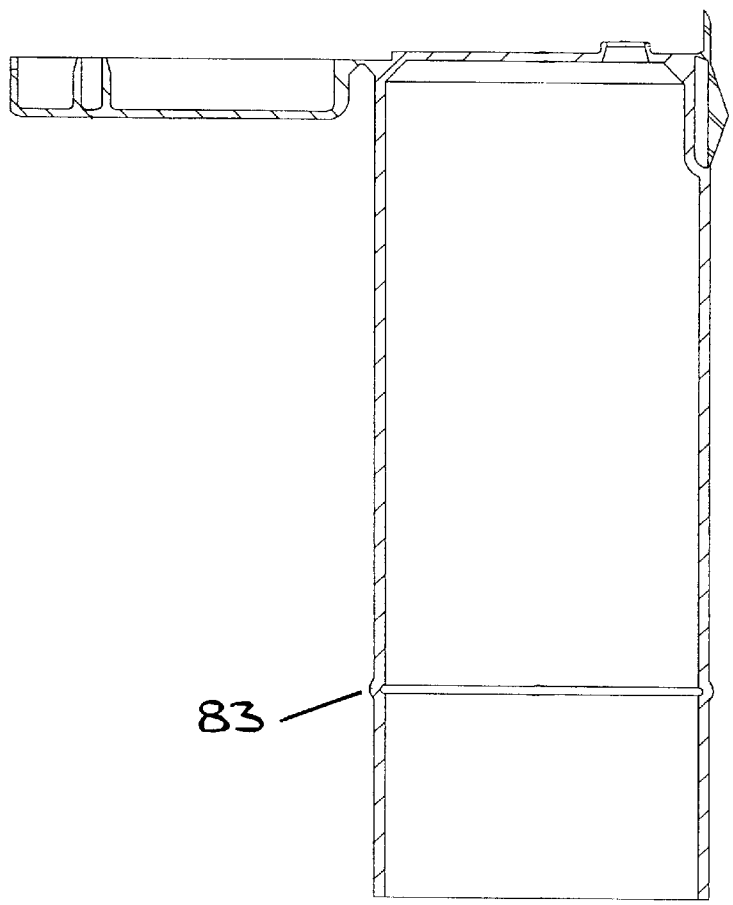
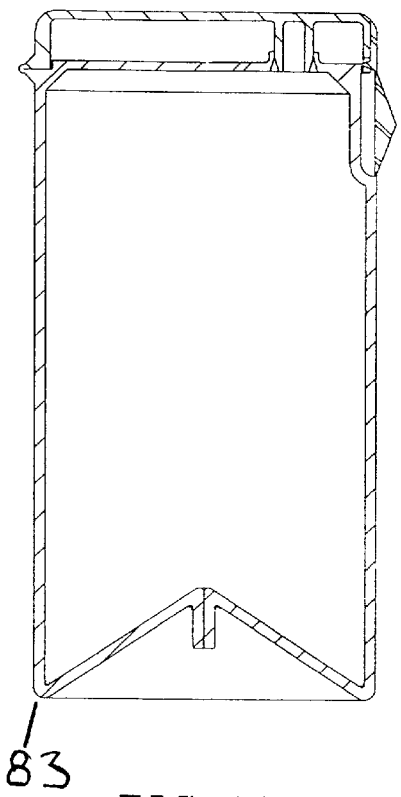
FIG. 99
FIG. 100

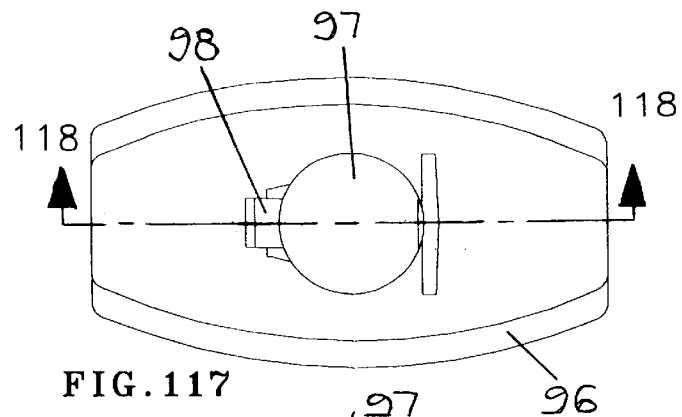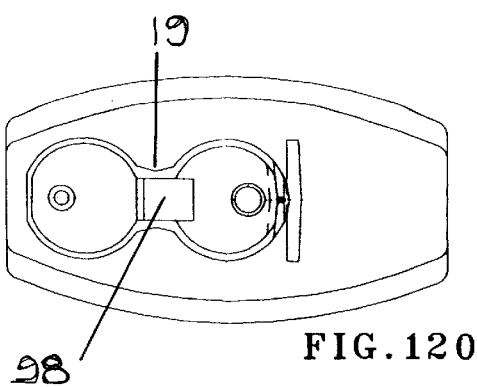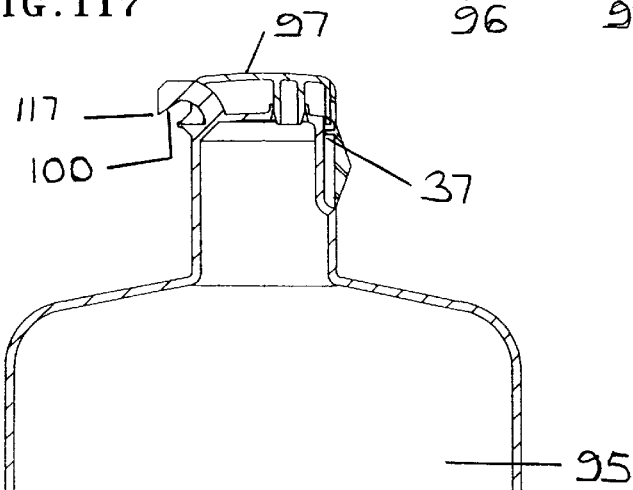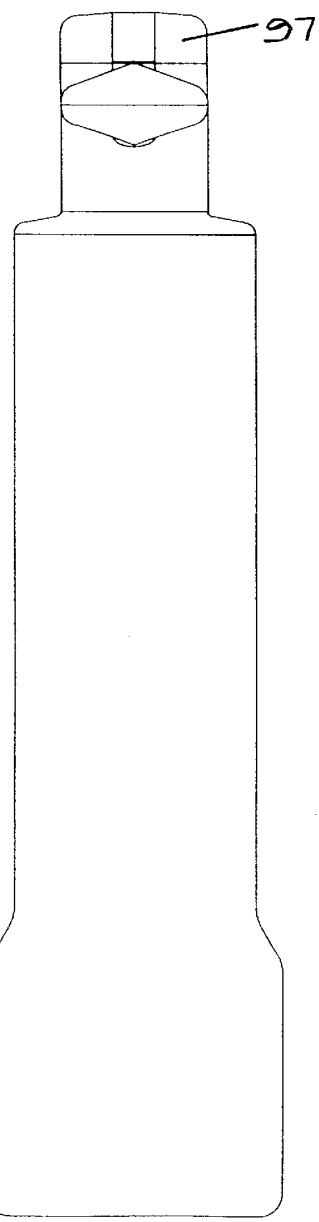
FIG.117
FIG.120
FIG.118
FIG.119

DOUBLE ORIFICE CONTAINER

INVENTION BACKGROUND

The present invention relates to containers for storing and/or dispensing a substance, to closures for use with such containers, to parisons for use in blow moulding operations to produce such containers and closures and to methods of forming both the parisons and the containers either with or without an associated closure.

Plastic bottles and containers are generally formed of two separate components, a main body and a closure, the two components usually being manufactured by different process. The main body is usually manufactured by extrusion blow moulding, injection blow moulding or by injection stretch blow moulding. If the container is a straight sided container it is usually manufactured by injection moulding. By contrast, the closure is usually manufactured by injection moulding.

The two components are often manufactured in separate factories and are then transported to a filling production line where they are then separately sorted and orientated. The main body is placed on the filling line and filled with the required contents. The closure is then assembled onto the body. The assembled container is typically then labelled before a number of additional operations are carried out, such as adding a tamper evident feature in the form of a shrink wrap sleeve. It is to be noted however, that each of the components making up the container require separate sets of tooling, manufacturing infrastructure, inventory control and handling equipment.

As a manufacturing process, extrusion blow moulding offers the advantage that undercuts can be easily formed enabling the production of hollow containers having a restricted neck or the like. Although hollow shapes such as a handle can be formed within the volume of the container, this process has the disadvantage that solid integral homogeneous components, such as solid handles, cannot be formed concurrently with the container in the same operation. By contrast, injection blow moulding and injection stretch blow moulding offer methods of manufacturing hollow containers having a restricted neck and which also allow for the provision of integral solid components such as one or more handles. Unfortunately, injection blow moulding is more expensive to tool up for and therefore usually requires large production volumes to justify the higher tooling cost or else added value in the product produced. The product produced by injection blow moulding or injection stretch blow moulding is undoubtedly superior to that produced by extrusion blow moulding since greater control of wall thickness and tolerances is possible and no waste is produced. However, injection blow moulding has the disadvantage of limitations due to blow ratios. The maximum parison length to neck diameter ratio (L/D) is generally accepted to be 12 to 1.

Typically a security feature is provided for containers that require evidence of tampering. This is usually in the form of a separate component which needs additional manufacturing effort, separate tooling and inventory control and which must be assembled to the finished container, usually on the filling line.

A separate screw or push on closure or a separate dispensing orifice plug is provided for containers where a small orifice is required for the metering out of flowable contents. The orifice is usually smaller than the top opening of the main body such as is the case, for example, with plastic shampoo bottles.

A typical closure may be provided with a plain film hinge with which to attach a dispensing cap to the body of the closure. A spring feature may also be provided, either separate from the hinge and integral with the closure or else integral with the hinge, in order to generate a spring action to facilitate the positive opening and closing of the dispensing cap and to keep the cap in an open position when pouring.

It is also known to provide plastic containers having two openings. Such containers are typically in the form of dispensing tubes and are commonly used for the dispensing of tooth paste. The tubes comprise a top end having a restricted opening from which the contents of the tube are dispensed and a bottom end having an opening through which the tube is first filled but which is subsequently sealed. The tube type container has the disadvantage that it can not be stood upright on its sealed end as a single sealing edge does not provide a stable base.

Containers are typically labelled either by attaching a self adhesive, preprinted label to the main body or by screen or other printing methods. In tool labelling is also becoming more popular. Generally a moulded container will possess a raised split line as a consequence of the moulding process. The position of this split line on the container is critical if the container is to be screen printed.

In regard to the cycle time of slender plastic moulded parts, it is advantageous to gate the part close to the area of the greatest restriction, as the gate is the hottest part of the tool and this increases the filling time.

It is more important than ever for packaging design to maximise the efficient use of raw materials and minimise the overall energy consumption required to produce the finished container. It is therefore advantageous to combine several design features into a single embodiment to reduce cost, increase efficiency and to produce a more worthy product.

Containers are produced in many shapes and sizes and are manufactured from a wide variety of materials. They employ many closures types and several different processing methods are used.

Recycling of the plastic used in packaging is required by the public as a result of the attention now given to environmental issues. However, many plastic containers consist of two plastic types, one plastic type for the closure and one plastic type for the body. If the two types of plastic are recycled together the plastic re-grind quality is lower than it would be if the two components were separated. This however, is a time consuming task.

INVENTION SUMMARY

It is more economic and environmentally friendly to provide an integrally manufactured one-piece plastic moulded container, with perhaps an integrally moulded security tear tab and cap spring feature, particularly if the container can be produced in one manufacturing machine. Such a container would enable easier and more greater efficient down stream processing and handling while the integrated nature of the design would provide significant advantages over the non-integrated container designs that are presently on offer.

According to a first aspect of the present invention there is provided a container for storing and/or dispensing a substance, the container defining a dispensing orifice and a filling orifice spaced from said dispensing orifice, the filling orifice being recessed into the container and permanently sealed following the introduction into the container of the substance to be stored and/or dispensed.

The container may comprise an integral re-openable dispensing cap closure, the cap closure being flexibly hinged to the top portion of the container In the pivoted closed state the dispensing cap cooperatively seals closed the dispensing orifice. The container may comprise a top portion integral with a body portion and a body portion integral with a bottom portion. The container may have a restricted neck type bottle shape. Alternatively it may have a straight sided top portion with a straight sided body portion or even a straight sided version with an open bottom portion. The bottom portion may consist generally of a truncated cone shape which is integral with and tappers from the side walls of the body to form a restricted neck filling tube which defines a lower aperture to the interior of the container. In the closed state the filling tube may be sealed shut and recessed up inside the container base within a concave envelope formed by the cone means. The container may stand stably and upright on the rim formed by the side walls of the container body and the cone means.

In one embodiment the cone means and filling tube are manufactured in situ. That is, recessed up inside the base of the container where the filling tube is subsequently sealed once the container has first been filled with the required contents. In a further embodiment the cone means and filling tube are manufactured outwardly and are only subsequently pushed up inside the base of the container. The cone means is optionally manufactured in such a way as to provide a spring-in action when it is pushed into the base of the container This has the advantage of locking the cone in place.

In another embodiment a tamper evident feature is provided integrally with the body of the container and is located partly within a scalloped finger access area in the front of the container top portion. The finger access area also provides access to the underside of the dispensing cap for ease of opening. A free end portion of the tear tab is adapted to be attached to a corresponding surface on the dispensing cap closure by, for example, welding once the cap has been pivoted closed. To aid in the forming and supporting of the tear tab prior to it being secured to the dispensing cap, a tear tab support tear point bridges the gap from the finger access area to the tear tab. Access to the container dispensing opening is gained by first removing a centre portion of the tear tab by shearing lower, top and support tear points by performing a tearing and pivoting action on the arms of the centre portion. In a further embodiment the support tear point is located above the top tear point and so hence removing the security tear tab feature consists of removing the centre portion and then forcibly opening the dispensing cap to shear the support tear point.

To provide a spring action to the opening and closing of the dispensing cap in one embodiment, a slot or hole is provided in the integral dispensing cap adjacent to the dispensing cap hinge area. An edge of the slot cooperatively and progressively interferingly mates in a cam-like manner with a top surface of a protruding cam-shaped cap spring tab. The cap spring tab projects from and is integral with the container top portion while the centre of curvature of the cam surface lies the hinge axis. The purpose of this feature is to give an increasing and decreasing resistance in a spring-like manner to the dispensing cap closure when it is pivoted open and closed and to ensure that the cap does not swing freely closed from an open position when contents are being dispensed from the container and the container is inverted at a pouring angle. As the dispensing cap is opened, a resistance is gradually encountered. Interference between the projecting cam-shaped tab and the mating dispensing cap surface increases to a maximum and then falls to zero. After the maximum point of resistance has been encountered, the cap will spring open of its own accord. Likewise, when the cap is pivoted closed, the resistance is gradually increased until the maximum point is reached whereupon the cap will spring closed of its own accord. The cap must then be pressed in further to ensure that a cooperating boss on the dispensing cap mates within and seals the dispensing orifice. The cam shape can either be positioned on the top surface of the projecting tab, on the underside surface or on either side of the tab and may be arranged to mate with the corresponding edge or edges of the cooperating slot or hole in the dispensing cap. Alternatively, the protruding spring tab cam feature can be positioned on the dispensing cap closure in which case the corresponding hole, slot or pocket may be provided on the container top portion. The protruding spring cam tab can either project over a single film hinge in an arcuate manner in which case a mating hole is provided in the dispensing cap or else the tab may be positioned between two mutually spaced cap film hinges in which case only a mating slot need be provided in the dispensing cap. The spring tab generally protrudes from the external surfaces of the closed dispensing cap.

The embodiments described can be manufactured by injection blow moulding or injection stretch blow moulding for the restricted neck versions and additionally by injection moulding for the straight sided option.

Because in a preferred embodiment the container comprises two mutually spaced orifices, the core rod in the injection blow moulded version can be supported at both ends. Normally one end would be unsupported. A protrusion on the core rod passes through the dispensing orifice into the tooling to fully support the core rod. This has the advantage of removing the previous limitation that the core rod length to parison inside diameter ratio (L/D) should not exceed 12:1. The gate for the parison is preferably positioned at the dispensing orifice end. This is advantageous to the material flow as this is the hot end of the tool and is adjacent the areas of greatest restriction, namely the dispensing cap hinge and the tear points of the tear tab.

The container can be any practical shape and size, and the split line can be arranged to run on the front or sides of the body thereby enabling in mould labelling or screen printing to be used.

The manufacturing process of the container may be divided into two parts, the first part being the production of the actual container. In the preferred process the dispensing cap is first pivoted closed and the tear tab fixed permanently to the cooperating surface on the dispensing cap by, for example, ultrasonic welding. All this prior to the container being removed from the moulding machine. Combining the cap closing and the tear tab fixing operations within the injection blow and injection stretch blow moulding (or injection moulding) cycle offers economic advantages. It utilises the dead or waiting time in the machine cycle, streamlines the production process, avoids having to re-orientate the container at a later downstream stage, eliminates tangling of and damage to open dispensing caps and tear tab assemblies and also flexes the living hinge giving it greater strength. The container can be transported and handled thereafter by standard equipment, for example, conveyors and bowel feeders. In a further embodiment in which the bottom portion is moulded outwardly, the filling tube can be pushed into the base of the container immediately after the moulding stage while the container is still hot. This has the advantage that the cone means is easier to push in and saves time in down stream processing.

The second part of the manufacturing process consists of transporting the container inverted on a filling line, filling it with the required contents and sealing the filling tube.

It is important to note that in a preferred embodiment the container is designed with no or few under cuts in order to keep tooling cost down and the production rate up.

The overall manufacturing approach to forming the container, closing the dispensing cap, attaching the free portion of the tear tab and then filling and sealing the filling tube offers a very simple, integrated, streamlined, unified, fast, effective and efficient system which represents an improvement over other container types and handling methods.

Other advantages of particular embodiments include the fact that they are environmentally friendly, involve minimal material usage, require low overall energy consumption, comprise one material type for ease of recycling, involve one uniform colour so that no colour matching of separate components is required, avoid the need to form threads, eliminate the need for a separate closure thereby reducing handling, cost, processing and inventory control and provide a fixed orientation of the dispensing cap with respect to the container body.

Typical uses of the container and versions of it include the storage and dispensing of any practical flowable non-flowable substance, although the tear tab and cap spring features can be applied to any container type.

DESCRIPTION OF DRAWINGS

A number of embodiments of the present invention will now be described by way of example with reference to the accompanying drawings in which:

FIG. 1 is a top plan view of a double orifice container with integral cap and integral tear tab according to one embodiment of the invention, the cap and tear tab being orientated on the major axis of an oval container having a restricted neck and shown in the open blow moulded state;

FIG. 2 is a front major axis sectional view of FIG. 1;

FIG. 3 is a side minor axis sectional view of FIG. 1;

FIG. 4 is a bottom plan view of FIG. 1;

FIG. 5 is a right hand side elevational view of FIG. 1;

FIG. 6 is a further embodiment of the type of container shown in FIGS. 1–5 but where the cap and tear tab are orientated through ninety degrees to lie on the minor axis of the oval, restricted neck bottle and an additional support tear point is centrally positioned on the tear tab;

FIG. 7 is a front minor axis sectional view of FIG. 6;

FIG. 8 is a left hand side view of FIG. 6;

FIG. 9 is a bottom plan view of FIG. 8;

FIG. 10 is a top plan view of the embodiment shown in FIGS. 1–5, but which has been inverted, had the cap closed, the tear tab fixed in place, has been filled with contents and had the top filling orifice sealed closed;

FIG. 11 is a front major axis sectional view of FIG. 10;

FIG. 12 is a side minor axis sectional view of FIG. 10;

FIG. 13 is a bottom plan view of FIG. 10;

FIG. 14 is an enlarged view of a section of the base of FIG. 11;

FIG. 30 is a top plan view of the embodiment shown in FIGS. 10–14, but shows the filling tube pushed half way into the base of the container;

FIG. 31 is a front major axis sectional view of FIG. 30;

FIG. 32 is a side minor axis sectional view of FIG. 30;

FIG. 33 is a top plan view of the embodiment shown in FIGS. 30–32, but shows the filling tube pushed fully into the base of the container;

FIG. 34 is a front major axis sectional view of FIG. 33;

FIG. 35 is a side minor axis sectional view of FIG. 33;

FIGS. 36–40 show the container in a minor axis sectional view, and illustrate the different stages of sealing and pushing in the filling tube;

FIGS. 41–46 Blank;

FIG. 47 is a top plan view of a container in accordance with FIGS. 33–35, but which has been filled, sealed, had the filling opening pushed in and is now standing upright;

FIG. 48 is a front major axis sectional view of FIG. 47;

FIG. 49 is a horizontal sectional view of FIG. 48;

FIG. 50 is a side minor axis sectional view of FIG. 47;

FIGS. 51–55 Blank;

FIG. 66 is a horizontal top plan fragmented sectional view of FIG. 67 showing a diagrammatic representation of a preform or parison tooling in the closed position, where the split line is on the axis of the dispensing cap and tear tab and no under cuts are present except for the inner surfaces of the dispensing cap;

FIG. 67 is a front fragmented sectional view through the parison and dispensing cap side core of FIG. 66, the top half of the tooling being removed for clarity and the section being on the split lines as indicated;

FIG. 68 is a side fragmented sectional view of FIG. 66;

FIG. 69 is a horizontal top plan fragmented sectional view through a diagrammatic representation of a closed blow tooling suitable for the formed parison of FIGS. 66–68, the tooling split line, dispensing cap and tear tab axis all lying on the major axis of the formed oval bottle;

FIG. 70 is a front fragmented sectional view through the formed container of FIG. 69 with the top half of the tooling removed for clarity, the section being on the split line as indicated and the main body of the core rod sectioned and the compressed air duct open;

FIG. 71 is a side fragmented sectional view of FIG. 69;

FIGS. 72–75 are major axis fragmented sectional views of one method of removing the container from the core rod and include the pivoting closed of the dispensing cap and the fixing of the tear tab to the dispensing cap;

FIG. 76 is a horizontal top plan fragmented sectional view through a diagrammatic representation of a preform or parison tooling, the split line being ninety degrees to the axis of the dispensing cap and tear tab so that side cores are required to release the dispensing cap and tear tab from the tooling;

FIG. 77 is a front fragmented sectional view of FIG. 76;

FIG. 78 is a side fragmented sectional view of FIG. 76 with the top half of the tooling removed for clarity, the section being on the split line as indicated;

FIG. 79 is a horizontal top plan fragmented sectional view through a diagrammatic representation of a blow tooling suitable for the formed parison of FIGS. 76–78, the tooling split line, dispensing cap and tear tab axis all lying on the major axis of the oval bottle;

FIG. 80 is a front fragmented sectional view of FIG. 79;

FIG. 81 is a side fragmented sectional view of FIG. 79 with the top half of the tooling removed for clarity, the section being on the split line as indicated and the main top body of the core rod sectioned and the compressed air duct open;

FIG. 99 is a sectional view of a further embodiment which is straight sided in the open state and which is suitable for manufacture by injection moulding;

FIG. 100 shows the embodiment of FIG. 99 in the closed, filled and sealed condition;

FIG. 117 is a top plan view of a further embodiment having the tear tab and cap spring features and in which the edge of the slot in the dispensing cap engages with the underside of the protruding spring cam tab, the bottom portion is moulded up inside the container base and the body portion is provided with a stepped out base, the dispensing cap being shown closed and the filling tube open;

FIG. 118 is a sectional view through FIG. 117;

FIG. 119 is a right hand side elevational view of FIG. 117;

FIG. 120 is a top plan view of FIG. 118 but with the open dispensing cap shown open;

DESCRIPTION OF EMBODIMENTS

Figure 15:
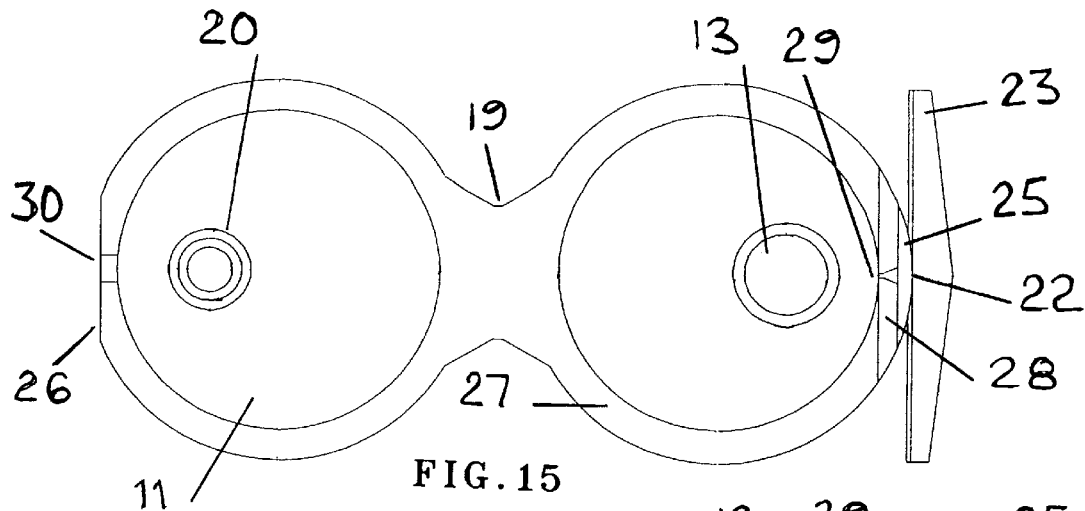
FIG. 15 is an enlarged part view of the neck area of FIG. 1.

Referring to FIGS. 1–5 of the drawings there is shown a restricted neck, double orifice, one-piece rigid plastic bottle 10, with integral dispensing cap 11 and optional tear tab arrangement 12. The container is shown in the as manufactured blow moulded open state. The container is formed by injection blow moulding or injection stretch moulding or other suitable methods. A straight sided version with an open bottom can be manufactured by injection moulding. Generally the container will consist of a top potion, a body portion and a bottom portion. In this embodiment the bottle shape is of oval cross-section but any other practical shape is possible, for example the bottle may be of circular cross-section. In plan view the open dispensing cap and tear tab assembly are aligned on the major axis of the oval bottle but any other orientation is possible. The dispensing cap 11 and tear tab assembly 12 are in line with each other but the tear tab could, for example, be orientated in top plan view at ninety degrees to the dispensing cap, that is, on the minor axis of the oval bottle.

The purpose of the top dispensing orifice 13 is to act as a restricted dispensing opening or nozzle for the metering out of flowable container contents. However, a full top opening the width of the container top is also possible. One or more dispensing orifices may be provided where flowable contents such as liquid or powder are to be dispensed in a shower-like manner. Any practical size, shape, pattern or configuration of dispensing orifices is possible.

The purpose of the lower filling orifice is to provide a suitable opening through which to fill the container with contents when it is inverted and to provide a means of sealing. The lower opening arrangement extends out past the base radius 18 of the container body and consists of a filling orifice 14, parallel tube section 15 and a generally tapered cone section 16. The cone forms a truncated shape or a frustum of a cone. The base of the cone mates with, in this case, the oval shape of the container and the top of the cone mates with, in this case, the circular parallel tube section 15.

The tube section 15 and neck portion of the container are shown as being of circular cross-section but any other practical shape is also possible. For example, the tube section may be of elliptical cross-section. The cone is shown with straight sided walls but these could alternatively be concave, convex or a combination of shapes to aid a spring-in action when the filling tube is pushed into the base of the container.

The integral dispensing cap 11 pivots at living hinge 19 and cooperatively mates with a top support ledge 27 of the container 10. The dispensing cap 11 carries a dispensing boss 20 which seals in the dispensing orifice 13. The ledge 27 extends for a full circumference diameter and mates with the removed scalloped finger access area 28 on the side of the container neck potion on the major axis. Due to the requirements of an integral living hinge, the plastic material used is likely to be polypropylene or versions of it, but any other suitable material may be used. The purpose of the scalloped finger access area is two fold; to provide an area for the tear tab to partly sit in and to enable sufficient access to open the dispensing cap once the tear tab is removed. In this case the dispensing orifice 13 is oriented vertically with the filling orifice 14 but any other orientation or off-set is possible. The filling orifice is shown on the centre axis of the container but any other orientation or off-set is possible.

The integral tear tab assembly 12 consists of lower attachment tear point 21, removable tear tab arm centre portion 23 which is triangular in cross-section and has symmetrical tear tab arms, upper attachment tear tab point 22, tear tab flap free portion 25 and tear tab flap support attachment tear point 29 which is positioned immediately above the upper tear point 22 and is a cone shaped projecting down to a pin point size tear point. Thus in this example three tear points are provided. The back of the tear tab 23 is flat and extends parallel to the flat section of the scalloped finger access area 28.

The tear tab centre portion 23 is attached to the container neck at the intersection of the neck and the apex of the finger access area 28 by lower tear point 21 and at the tear tab support tear point 29. The two tear points which attach the tear tab assembly to the container body 21 and 29 are where the plastic material must pass through to fill the cavity to form the tear tab. The tear tab support tear point 29 bridges the gap to the top edge of the ledge 27 in the centre of the finger access area 28. The purpose of the tear tab flap support point 29 is to provide support to the tear tab flap 25 during manufacture until it is fixed permanently to the dispensing cap 11 by, for example, ultrasonic welding. Other possible plastic joining methods include mechanical fixing, adhesives, electromagnetic bonding, hot plate welding, induction welding, radio frequency welding, spin welding and vibration welding.

The front of the dispensing cap 11 has a flat surface 26 which mates with a corresponding flat surface on the tear tab flap 25 when the dispensing cap 11 is pivoted closed. The tear tab flap 25 is of the same cross sectional shape as the removed segment from the front of the dispensing cap. The flat surface 26 of the dispensing cap does not penetrate the inside diameter of the dispensing cap, but if it did, a corresponding flat surface would be required on the inside diameter of the cap and on the ledge circumference 27. A corresponding slot 30 is provided in the wall of the dispensing cap at the centre of the flat surface 26 to give clearance to the cone shape of the tear tab support tear point 29.

Additionally, the hollow container has side walls 17 and blow-by-grooves 24 which aid in the sealing of the parison 31 to the core rod when compressed air is fed in to form the container shape. The cone means 16 and filling tube 15 may have walls thinner or thicker than the body wall section 17 of the rest of the container so as to aid the spring-in effect when being pushed up into the base of the container.

An important manufacturing feature of the container is that no or few undercuts are required in the parison and blow tooling when the tooling part line is on the major axis of the container 10 although a side core is required for the inside surfaces of the dispensing cap. In this case the tear points for the tear tab assembly 12 are all located on the split line but could be off set.

Referring to FIGS. 6–9 of the drawings there is shown a further double orifice integrally moulded container 38 with a dispensing cap and tear tab very similar to the container 10 of FIGS. 1–5, except that hence the dispensing cap 11 and tear tab assembly 12 have been rotated through ninety degrees to be orientated on the minor axis of the oval bottle. In addition, a fourth tear point 32 is provided to further aid the material flow and give more support to the tear tab flap. This fourth tear point 32, which is again cone shaped, bridges the gap from the finger access area 28 to the tear tab 23 on the minor axis of the container 38.

Referring to FIGS. 10–14 of the drawings there is shown an identical container to that illustrated in FIGS. 1–5 which has been inverted, had the dispensing cap 11 pivoted closed and the tear tab free flap 25 permanently welded to the flat surface 26 on the dispensing cap 11. The container has then been filled with the required contents 34. Finally, the filling tube section 15 has been symmetrically squeezed flat on the major axis of the container to form a single straight line sealing area 33, although clearly other sealing patterns are possible, such as a star shaped or in the manner of a shot gun cartridge, and has been permanently sealed by ultrasonic welding or by other suitable means. Preferably the filling tube is pushed into the base of the container prior to it being sealed. If not the container will become pressurised if it is sealed before it is pressed into the container base, unless air is first removed from the container creating a partial vacuum. The enlargement FIG. 14 shows the bottom radius 18 with a larger wall thickness than the container wall 17 giving greater strength. There is also a definite kink flexure point at the intersection of the cone 16 and the body side walls 17. This gives a definite bend point for when the cone 16 is pushed into the base of the container.

Figure 16:
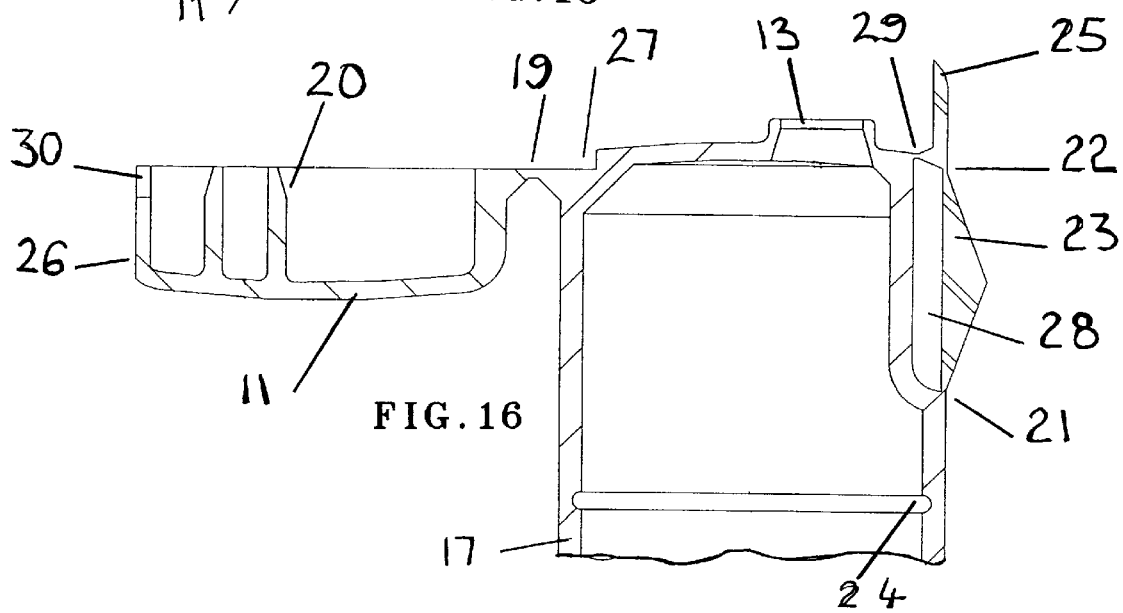
FIG. 16 is an enlarged part view of the neck area of FIG. 2.
Figure 17:
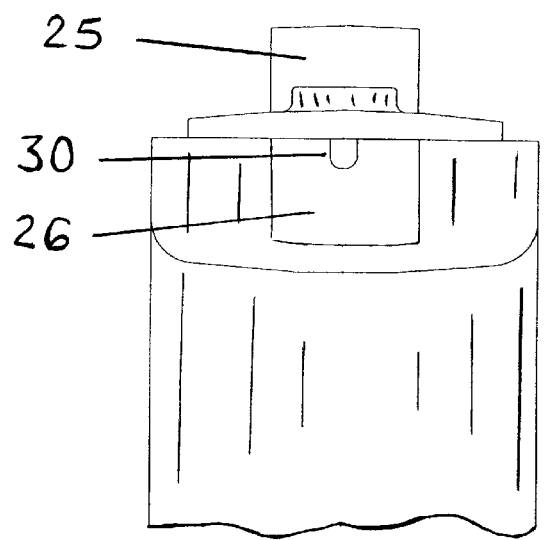
FIG. 17 is an enlarged fragmented view of the neck area of FIG. 8.
Figure 18:
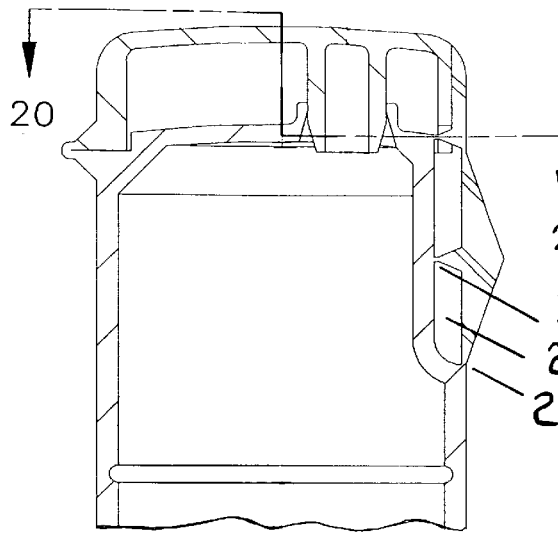
FIG. 18 is an enlarged fragmented view of the neck area of FIG. 7.
Figure 19:
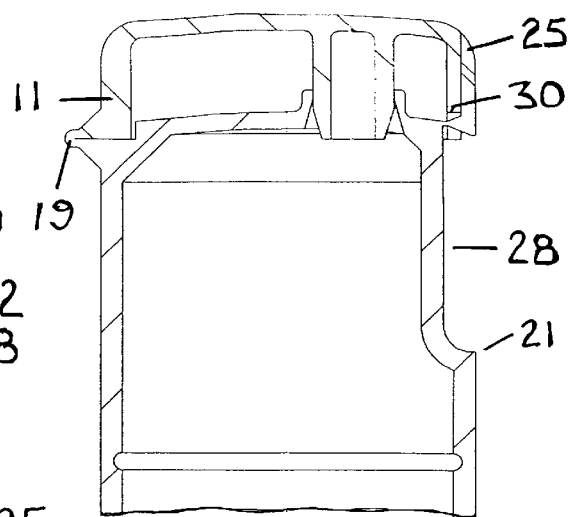
FIG. 19 is as per FIG. 18 but with the tear tab removed and is an enlarged fragmented view of the neck area of FIG. 57.
Figure 20:
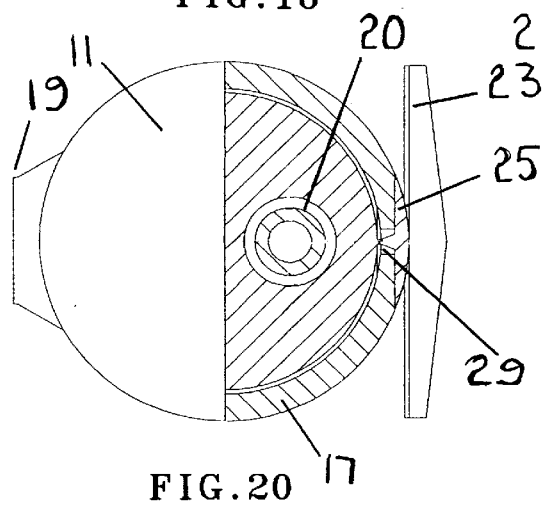
FIG. 20 is a top plan sectional view of FIG. 18.
Figure 21:
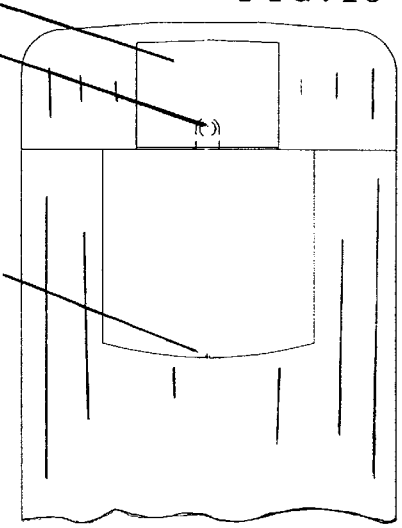
FIG. 21 is a right hand side elevational view of FIG. 19 and an enlarged fragmented view of the neck area of FIG. 54.

FIGS. 15–17 of the drawings illustrate fragmented neck enlargement views of the container of FIGS. 1–5.

FIGS. 18–21 show fragmented neck enlargement views of the container 38 of FIGS. 6–9 in which the dispensing cap 11 has been pivoted closed through 180 degrees and the tear tab 25 permanently attached to the flat surface 26 of the dispensing cap by ultrasonic welding or some other suitable means. The tear tab 23 has been removed in FIG. 19 and FIG. 21, to enable access to be gained to the dispensing cap 11. To do this the tear tab 23 is first removed by twisting it around the neck of the container so as to break the lower tear point 21, upper tear point 22 and support tear point 32. Breaking of the tear tab flap tear point 29 is also then required. This can be achieved by for example, giving the front of the dispensing cap an underside knock within the finger access area 28 on the edge of a table. Hence the complete removal of the security tear tab requires two actions. This gives greater protection to the container but is easy for the user to preform. It also offers a clear means of identifying, both physically and visually, whether a container has been tampered with. The tear tab flap 25 stays permanently attached to the dispensing cap 11 but does not hinder the containers use. The upper tear point 22 tears off above the edge of the dispensing cap, thereby reducing the likelihood of any sharp remains of the tear point 22 digging into the user's fingers when the dispensing cap is opened.

A further embodiment of the tear tab arrangement is shown in fragmented form in FIGS. 22–23 where a further tear point 37 is provided immediately below the upper tear point 22 and bridges the gap to the front surface of the finger scallop area 28. A further tear point 35 is provided above the upper tear point 22 and bridges the gap to the front top edge of the dispensing orifice boss 36. Both tear points 22 and 35 are cone shaped and project to a pin point. A corresponding clearance slot is provided centrally on the flat surface 26 of the dispensing cap 11 for the cone 35. The purpose of this tear tab embodiment is to give greater support to the tear tab flap 25 during manufacture and to increase material flow.

Figure 22:
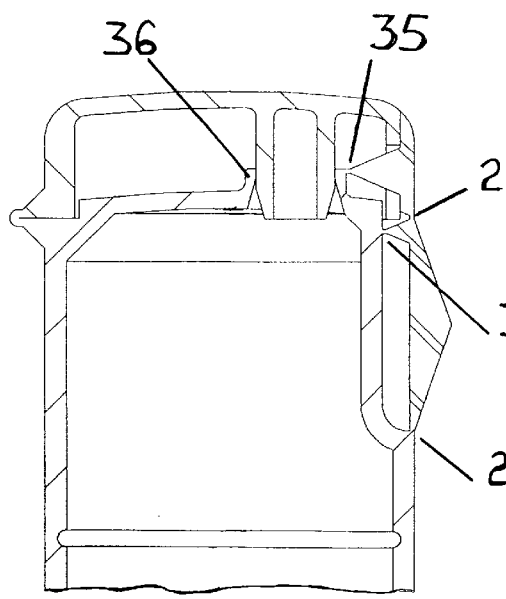
FIG. 22 is a fragmented sectional view of the neck area of a further embodiment where the cap is closed and two support tear points are provided, one above and one below the top tear point.
Figure 23:
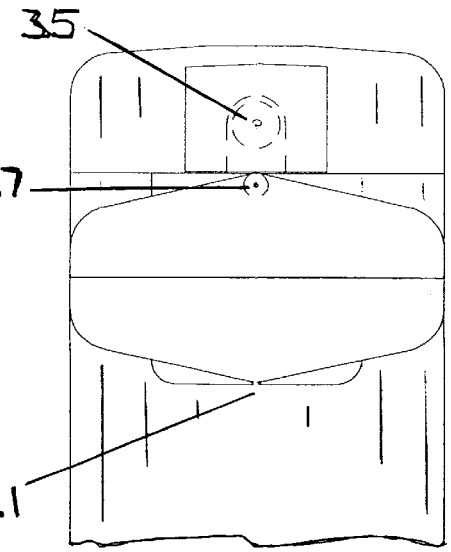
FIG. 23 is a right hand side elevational view of FIG. 22.
Figure 24:
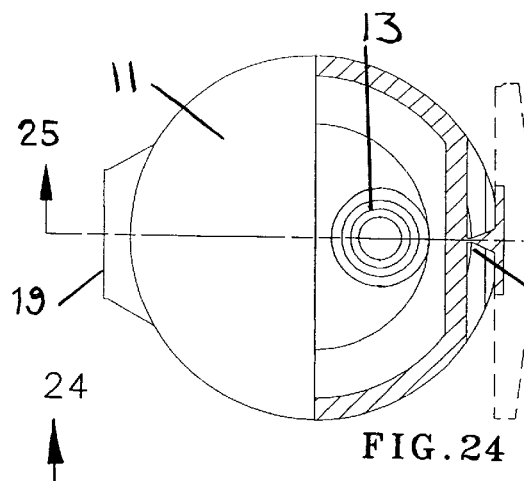
FIG. 24 is a top plan sectional view of a further embodiment of the neck area where the cap is closed and one support tear point is provided below the top tear point.
Figure 27:
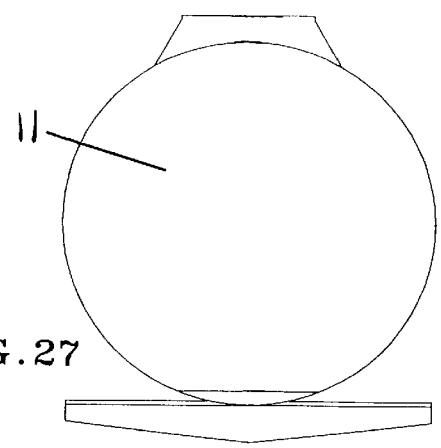
FIG. 27 is a top plan view of FIG. 26 and an enlarged view of the neck area of FIG. 13.
Figure 25:
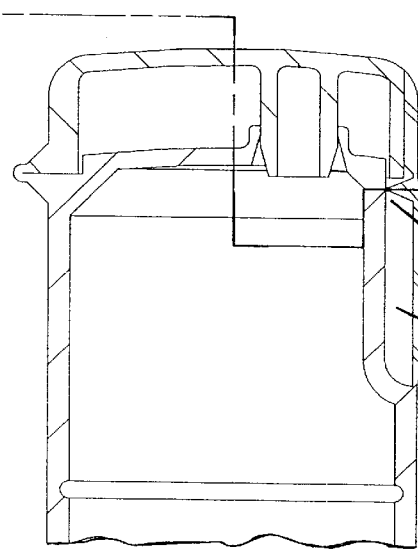
FIG. 25 is a front sectional elevational view of FIG. 24.
Figure 26:
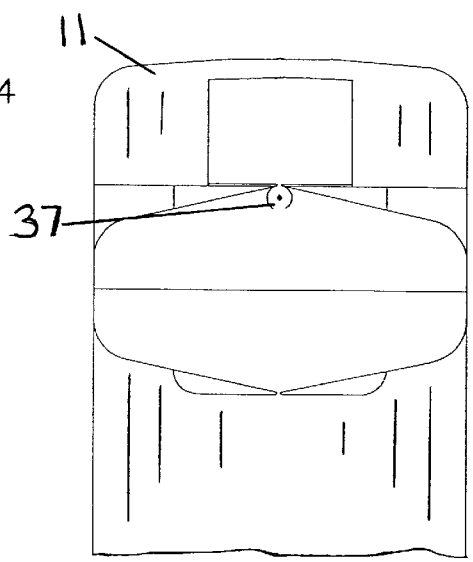
FIG. 26 is a right hand side elevational view of FIG. 25.
Figure 28:
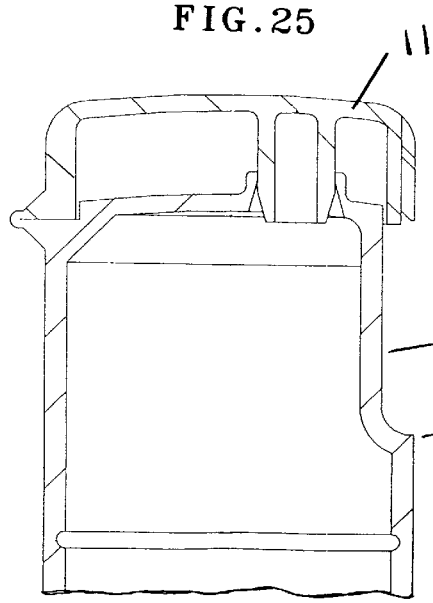
FIG. 28 shows the tear tab removed from FIG. 25.
Figure 29:
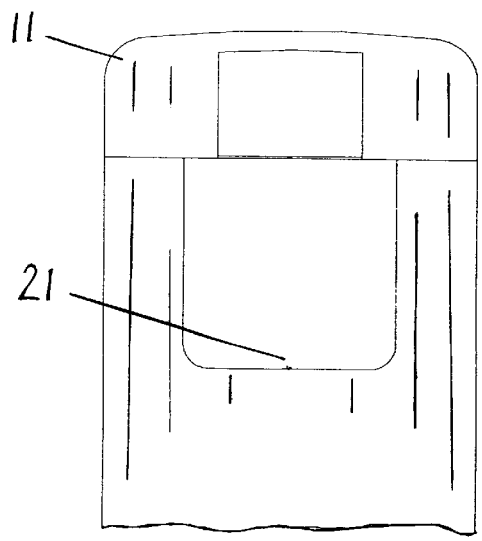
FIG. 29 is a right hand side elevational view of FIG. 28.
Figure 56:
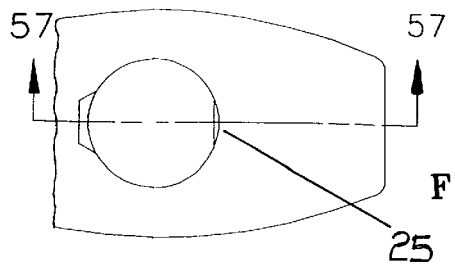
FIG. 56 is a top plan view as per FIGS. 47–50, except that the tear tab has been removed.
Figure 57:
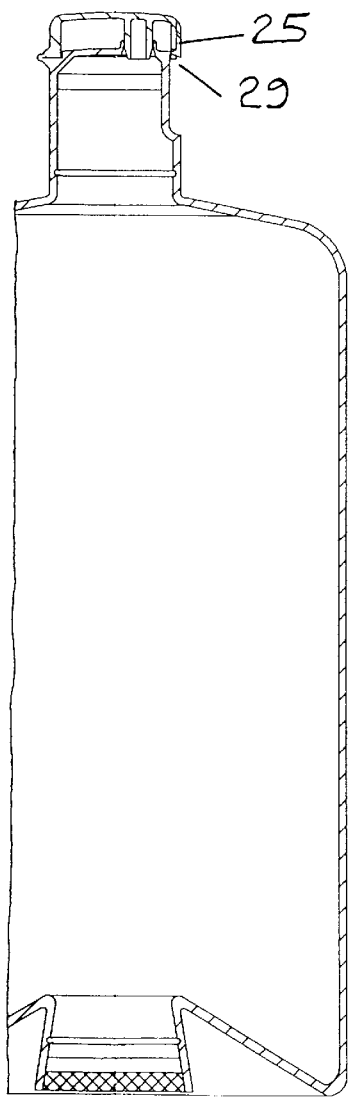
FIG. 57 is a front major axis sectional view of FIG. 56.
Figure 59:
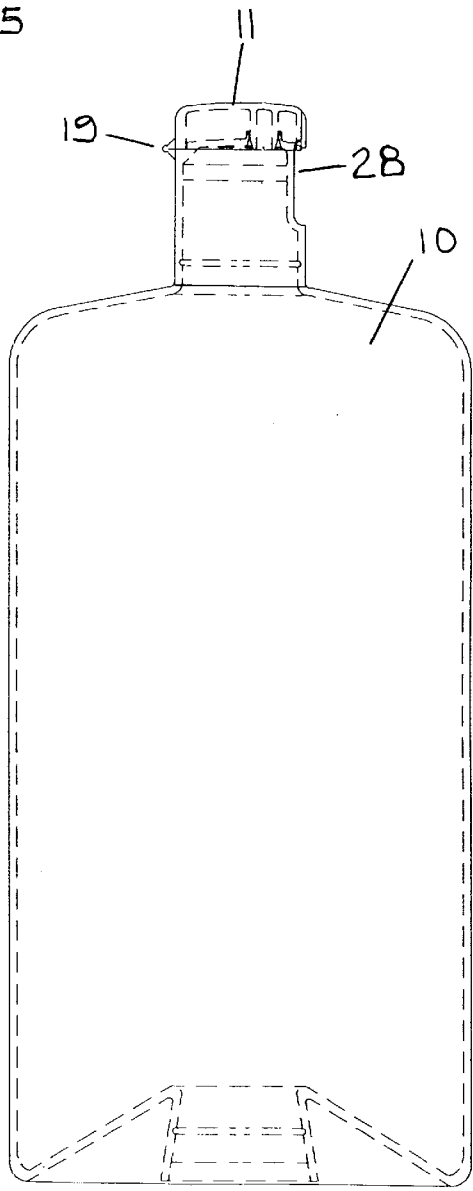
FIG. 59 is a right hand side elevational view of FIG. 57.
Figure 60:
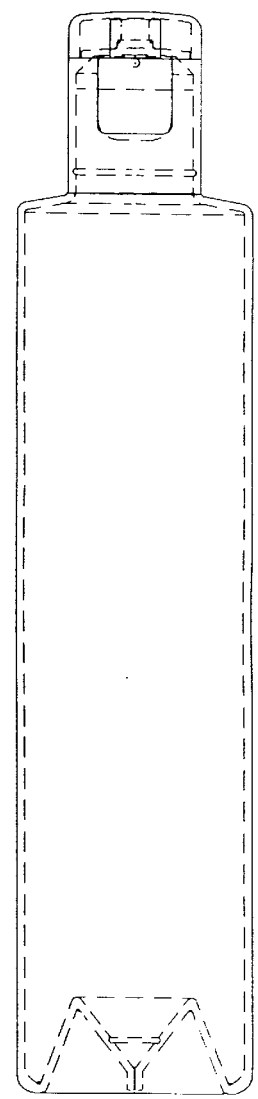
FIG. 60 is a front elevational view of FIG. 56.
Figure 58:
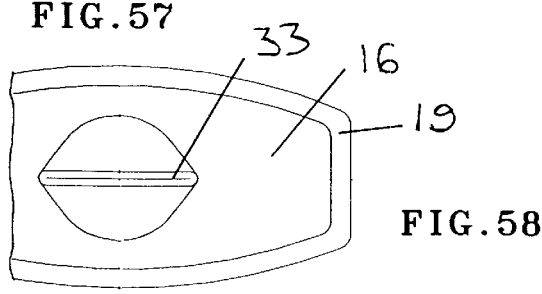
FIG. 58 is a bottom plan view of FIG. 57.
Figure 61:
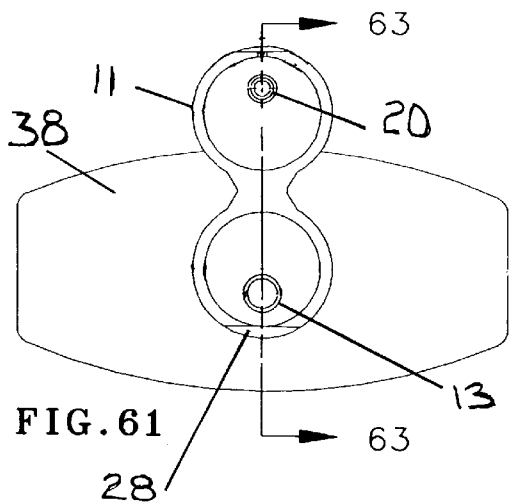
FIG. 61 is a top plan view of the embodiment shown in FIGS. 56–60, except that the cap and tear tab are orientated on the minor axis of the oval body shape container as per FIGS. 6–9 and the dispensing cap has been opened by breaking the tear tab support.

FIGS. 24–29 of the drawings illustrate fragmented neck views of the tear tab FIGS. 22–23 in various stages of use.

FIGS. 30–32 of the drawings illustrate the container of FIGS. 10–13 at a stage further on in the filling and sealing part of the manufacturing process. The filling tube 15 and cone means 16 form a disc shape similar to a Belleville spring washer and are shown pushed half-way into the base of the inverted, filled and sealed container. This half-way stage is only shown to describe the mechanics of the process. In reality the filling tube is pushed into the base of the container without stopping halfway. The front sectional major axis elevational view of FIG. 31 shows the intersection of the cone 16 and the tube 15 deviating from the subtended arc 40, where the centre or flexure point is the intersection of the cone base at the base radius 18. This deviation represents a spring-in force generated from the disc shape of cone 16. This spring-in force aids the pushing-in of the filling tube into the base of the container. Once the over bending point is reached the filling tube will flick into the base of the container. This spring-in force together with the material stiffness will prevent the filling tube from being forced back out from the container base, which is not desirable unless the tube is to be re-opened for refilling purposes. FIG. 32 shows the walls of the cone 16 bowing outwards. This is because in the minor axis sectional elevational view of the oval bottle, there is not enough distance between the base of the cone at radius 18 and the top of the cone at the filling tube intersection to give a spring action. The cone sides are required to be forced down into the base of the container and may either bow outward as shown or bow inward. The bowing action and spring action of the cone walls may be improved by the use of concave or convex cone walls. For a round container where the filling tube is much smaller than the container diameter only a spring action will occur. The sealed filling orifice as shown dotted prior to it being pushed in. See also FIGS. 10–13. The shape of the sealed and pushed in cone and filling tube, the force produced from the spring action and material rigidity overcome the mass of the container contents, the inertia forces associated with the contents and any squeezing action on the side walls of the container.

FIGS. 33–35 show the filling orifice fully pushed into the base of the container body, and the top of the sealed filling tube below the level of the container base. The filling tube in this case is not designed to be pulled up and reopened, although alternatives are offered in the following figures.

FIGS. 36–40 illustrate one method of sealing and pushing in the filling tube 15. After filling the container with the required contents, it is transported to the combined sealing and push-in station either by rotary indexing or by means of an inline system. FIG. 36 shows the container 10 within guide rails 42 on a conveyor 43 and with the filling tube 15 open. An ultrasonic horn 41 and anvil 44 are disposed above the conveyor and are also shown open. The horn and anvil are contoured to accommodate the shape of the filling tube 15 and to give a single straight line sealing area 33. FIG. 37 shows the horn and anvil closed and the filling tube 15 squeezed closed and sealed, forming sealing area 33. FIG. 38 shows the horn and anvil pushing the tube and cone into the container base. The bend or flexure point is about the outside of the circular horn and anvil at the intersection of the filling tube and cone. Prior to the pushing—in operation, it may be necessary to open the horn and anvil slightly to eliminate the sealing pressure. In this way in FIG. 39 the horn and anvil can be lifted straight up. FIG. 40 shows the horn and anvil open ready to receive the next container. The horn and anvil open and close in unison parallel to the line of the conveyer and are pneumatically operated. The horn is attached to an ultrasonic wave generator. The advantage of this system is that the horn and anvil may be used to facilitate a combined squeezing, sealing and pushing—in operation. Alternatively the filling tube can be pushed in and then sealed, either on the minor axis or the major axis of an oval bottle or indeed on any orientation. This is particularly true for a round container where orientation is more difficult. In another arrangement the pushing-in can be at the filling station where the filling nozzle engages with the filling orifice 14 and may be used to push it down, the filling tube and cone being able to react with more force.

FIGS. 47–50 illustrate the container 10 in a finished state. It is filled, sealed, upright and ready for use.

FIGS. 56–60 show the container 10, as per FIGS. 47–50 but with the tear tab 23 removed.

Figure 65:
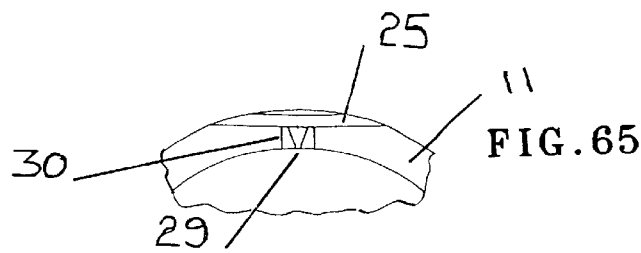
FIG. 65 is a fragmented enlarged view of the front area of the dispensing cap of FIG. 61.
Figure 64:
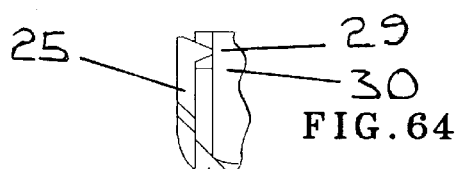
FIG. 64 is a fragmented enlarged sectional view of FIG. 63 showing the now permanently fixed remaining top free portion of the tear tab.
Figure 62:
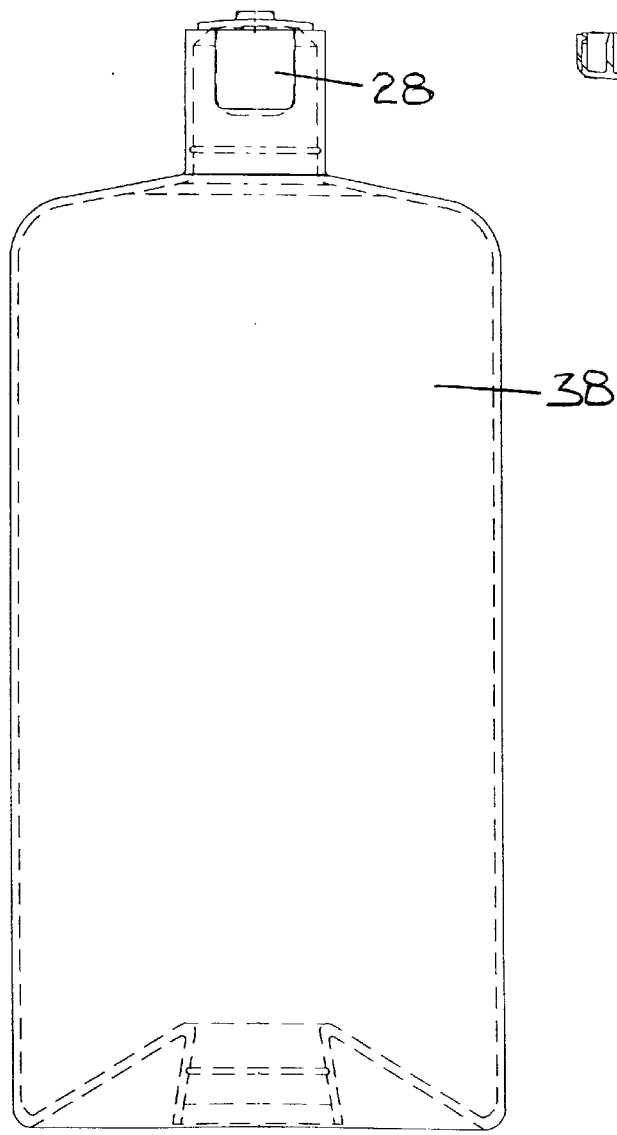
FIG. 62 is a front elevational view of FIG. 61.
Figure 63:
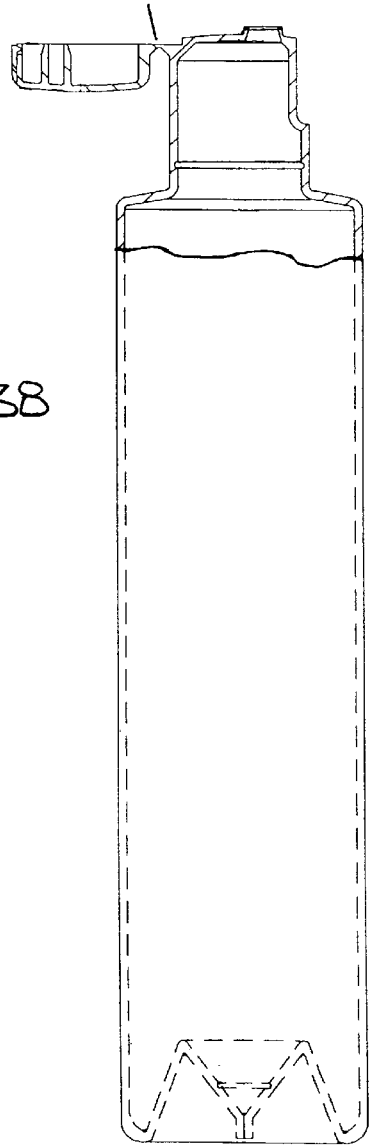
FIG. 63 is a side minor axis part sectional view of FIG. 61.

FIGS. 61–65 illustrate a container 38 in which the dispensing cap and tear tab are orientated on the minor axis of the oval bottle, and one step further on from that shown in FIGS. 56–60. The tear point 29 has been broken and the dispensing cap 11 opened. Two enlargements, FIGS. 64 and 65, show the cone shaped tear point 29 integral with tear tab flap 25 which is attached to the flat surface 26 of the dispensing cap 11.

Injection blow moulding is one method of forming a restricted neck plastic container with integral solid components. Injection stretch blow moulding is a version of this process in which the parison is stretched out along the core rod axis prior to or during the blow operation. Extrusion blow moulding is a common manufacturing method for forming restricted neck containers and containers where under cuts are difficult to form by other methods such as by injection moulding. However, solid integral components can not be formed by the extrusion blow moulding process. The most common injection blow moulding process is the Gussoni method. This consists of three steps, the injection moulding of the parison, the blow moulding of the parison and an ejection step in which the finished container is removed from the core rod. The longest part of the cycle is associated with the injection moulding and subsequent cooling of the parison.

FIGS. 66–67 show diagrammatically the first stage of a Gussoni three step injection blow moulding process where in which a double orifice preform or parison is formed. The mould tool components consist of a split tool comprising left hand parison cavity 47 and right hand parison cavity 48 together with parison filling tube ring halves 49, parison neck ring halves 50, dispensing cap core 51, sprue bush 52, sprue bush ring halves 53, core rod body 46 and core rod tip 54.

The components are mounted onto suitable tool bolsters or die sets and the core rod is mounted to a centrally positioned indexing head. The core rod tip 54 passes through the dispensing orifice 13 and is located and supported in the sprue bush ring halves 53. This support offers the advantage that the core rod is stiffer and so enables a result a greater core rod length to core rod diameter ratio (L/D) to be achieved. The plastic melt is injected into the cavity at high pressure and in the past has had the effect of pushing the free end of the core rod off centre and changing the parison shape. Hence supporting the core rod end gives the advantage of producing larger and more slender containers.

The core rod is in two parts. The core rod tip 54 is located to slide within the hollow core rod body 46. This allows compressed air to enter the parison when in the blow station. Flowable plastic material is injected into the cavity created by the core rod and tool cavity surfaces. For clarity no cooling channels, vents, fasteners and other known art is shown. Blow-by-grooves 24 are formed in both ends of the parison. The grooves take the form of a Semi-circular concave depression in the wall of the parison although convex boss blow-by-grooves can also be used. The purpose of the blow-by-grooves is to help keep the parison on the core rod during transfer to the blow station when it is hot and flexible and also to act as a compressed air labyrinth seal so that little or no leakage occurs.

There can be no or little under cut on the core rod itself. This is to aid the removal of the formed container. Ideally the size and shape of the core rod tip at the container neck should be smaller than the filling orifice This means that a small step or tapper is required along the length of the core rod. If for example, the container neck is elliptical, the filling orifice 14 would need to define a slightly larger ellipse or perhaps a circle having a diameter slightly larger than the major axis of the elliptical neck. Having an elliptical filling tube with it's major axis on the major axis of an oval container would aid the sealing operation as the tube would already, in effect, be half squeezed closed.

Using the Gussoni method, as the right hand or top parison cavity 48 is moved up, the dispensing cap side core is moved out, either by a cam pin or some other means, and the core rod with the moulded parison 31 is lifted up out of the lower or left parison cavity 47 and indexed to the blow station. Alternately, both the left and right hand parison cavities may move outward from the dispensing cap core enabling the dispensing cap to be simultaneously ejected off the core by ejector pins as the core rod is moved axially away from the core.

No under cuts exist in this mould arrangement for the parison apart from the requirement of a dispensing cap core which is located centrally on the split line. The split line runs through the centre of the; core rod, dispensing orifice 13, dispensing cap 11 and tear tab arrangement 12, and bisects the cap hinge line 19 at right angles. In this case the sprue is located adjacent the dispensing orifice, on the split line and off the centre line of the core rod. However, any other practical orientation and off-set of the sprue is possible.

For container 10 the parison split line and blow tool split line are oriented on the major axis of the oval bottle. However, if the parison was to be used to form container 38, where the parison split line is on the minor axis and the blow tool split line is on the major axis, then the core rod and parison must be rotated through ninety degrees prior to the blow station. This might be accomplished by, for example, motor, pivot arm, rack and pinion, chain drive or other methods. The aim being to keep the parison tool simple and to reduce the join line on the minor axis for printing purposes whilst at the same time having a dispensing cap orientation to the front. The parison split line will in any event be partly squashed flat by the force exerted by the compressed air in the blow station.

The parison is shaped so that when the container is expanded using compressed air in the blow station, a generally even wall thickness container is formed. For this reason some areas of the parison have to be thicker than others and contoured correctly.

FIGS. 66–68 show the second stage of the Gussoni injection blow moulding method. The blow mould components consist of a split blow tool defines a cavity of the required container shape and comprises left hand blow cavity 56 and right hand blow cavity 57. The two tool halves define Authorised Representativecavity 60 which provides a clearance for the open dispensing cap 11 and tear tab assembly 12, and further comprise blow filling tube ring halves 58 and core rod air shaft 55 which is attached to the core rod tip 54. When the core rod shaft is pushed forward, the core rod air entrance 59 opens to allow the passage of compressed air. As compressed air enters into the parison, it expands to conform with the contours of the cavity and to form the container shape. The split line is on the major axis of the oval container 10. It may be necessary to open the air entrance 59 prior to the parison being placed into the blow cavity, where an air valve opens once the blow cavity is closed. To open the air entrance 59 the parison has to be stretched out slightly and could otherwise stay closed if the neck of the parison is squeezed within the blow cavity. Extending the core rod tip 54 outwards, is one method of stretching the parison for processing materials such as PET and OPP.

Other injection blow moulding methods including those of Piotrowsky, Moslo, Farkus and injection stretch processes can be adapted for the manufacture of the illustrated double orifice integral container and versions of it.

Figure 74:
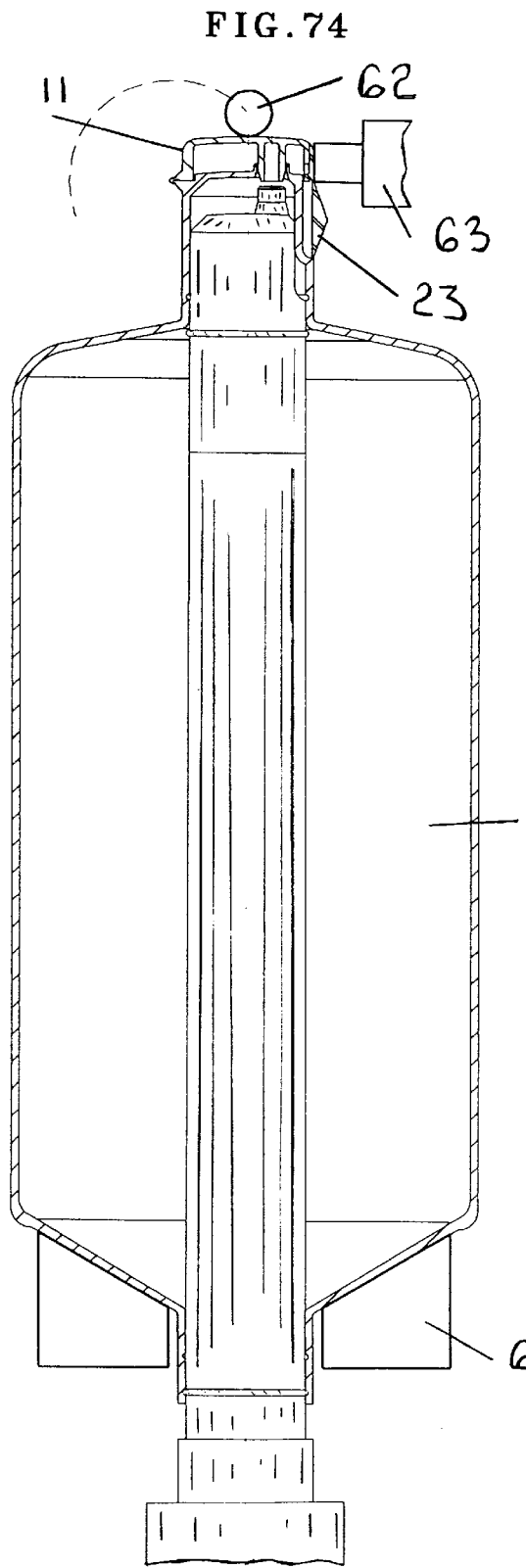
Figure 75:
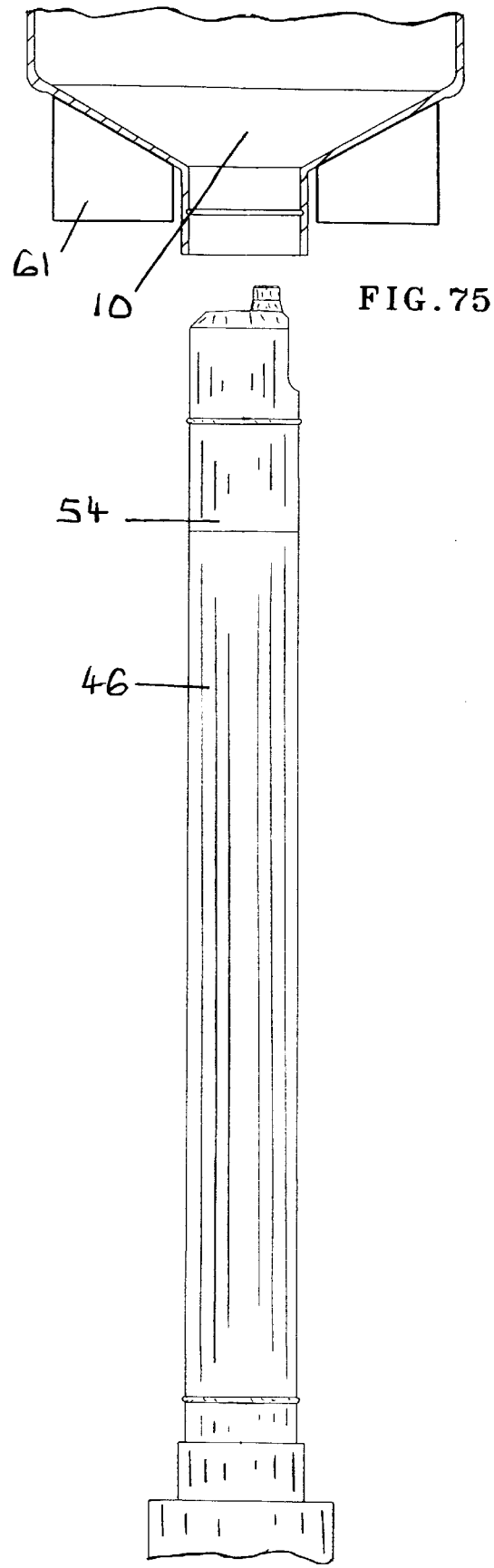

FIGS. 72–75 illustrate the operational sequence which makes efficient use of the dead or waiting time in the Gussoni injection blow moulding cycle. This occurs while waiting for the injection of plastic and the cooling of the parison and it is proposed that during this period the dispensing cap 11 should be pivoted closed and the tear tab flap 25 ultrasonically welded, for example, to the flat 26 on the front of the dispensing cap 11. This may be performed at the third station, prior to the container being ejected off the core rod. Two advantages of closing the dispensing cap and fixing the tear tab flap is that the container is already orientated and damage is avoided to the fragile tear tab flap 25 and tear points 21, 22, 29, 35 and 37. If the cap and flap are joined as soon as possible in the manufacturing process not only is the tangling of the open cap and tear tab flap with other containers and the handling equipment eliminated but the hinge is also flexed while it is still warm. FIG. 72 shows the blown container with a 'U' shaped strip off bar 61. The bar may well extend out past the base radius 18 to give a stronger push point on the container. In FIG. 73 the container is shown pushed off the core rod by the stripper bar 61 just enough for the dispensing orifice 13 to be clear of the core rod tip 54. Alternatively the container may be pulled off or a combination of pulling and pushing may be used. Pulling may be better if the container is still very hot and flexible. A pivot pin 62 is positioned ready to close the dispensing cap and an ultrasonic horn 63 is positioned ready to weld the tear tab flap 25 to the front of the dispensing cap 11. FIG. 74 shows the dispensing cap 11 pivoted closed by the pivot bar 62 and the ultrasonic horn 63 welding the tear tab flap to the dispensing cap 11. It may be necessary for the dispensing cap to have an anvil for the horn to press against if the container sitting on the core rod is not able to provide enough support. The pivot bar and the horn then retract. FIG. 75 shows the container removed form the core rod by the stripper bar 61 which has moved forward.

FIGS. 76–78 illustrate diagrammatically the parison tooling for manufacturing container 38 according to the Gussoni injection blow moulding method where the dispensing cap and tear tab are orientated on the minor axis and where rotation of the core rod is not necessary, the parison and blow split lines being on the major axis of the oval container body. The split line of the parison tooling runs through the centre of the parison, parallel to the hinge 19 and at right angles to the centre line of the dispensing cap and back flat inside face of the tear tab 23. Symmetrical side cores 64 and 65 are positioned in the left hand parison cavity 66, and symmetrical side cores 67 and 68 are positioned in the right hand parison cavity 69. The side cores are only used in the neck area of the container. In operation the side cores 64, 65, 67 and 68 must move outwards before the parison cavity halves 66 and 69 can move apart to release the parison. In most other ways the tooling is similar to that of FIGS. 66–68. Thus it is now possible to provide an oval container 38 in which the tear tab and dispensing cap are orientated on the minor axis and where the split line for the parison and blow cavities are positioned on the major axis. This is important if the container is to be printed by screen printing or other processes where even the smallest join line or bump on the plastic surface can cause problems.

The blow cavity for the above parison tooling which is illustrated, FIGS. 79–81 is similar to the blow cavity shown in FIGS. 69–71, except that the clearance cavity 60 is orientated on the minor axis of the container and not the major axis.

In another arrangement the dispensing cap core and/or a lower tooling arrangement can be used as the carrier from station to station instead of the core rod enabling the core rod to be withdrawn at the parison station. In yet another arrangement the parison tool is not split where it is pulled out from the neck side.

Figure 82:
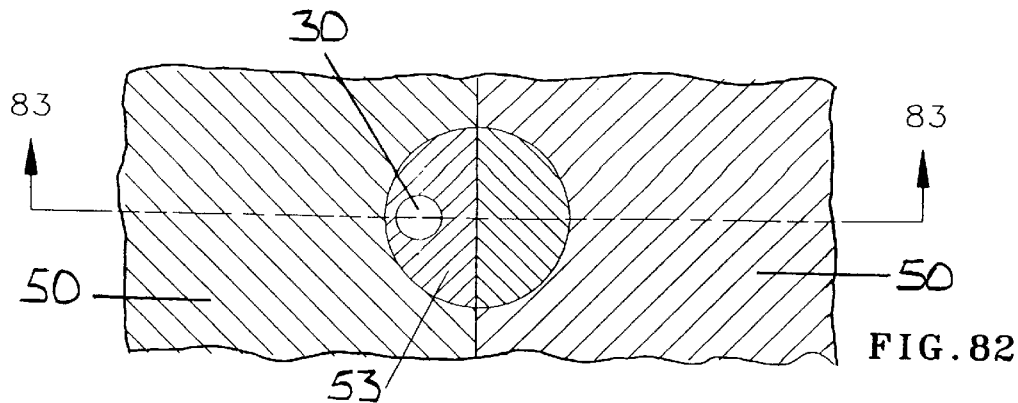
FIG. 82 is a top plan fragmented sectional view of another embodiment for injecting plastics into the parison tool.
Figure 83:
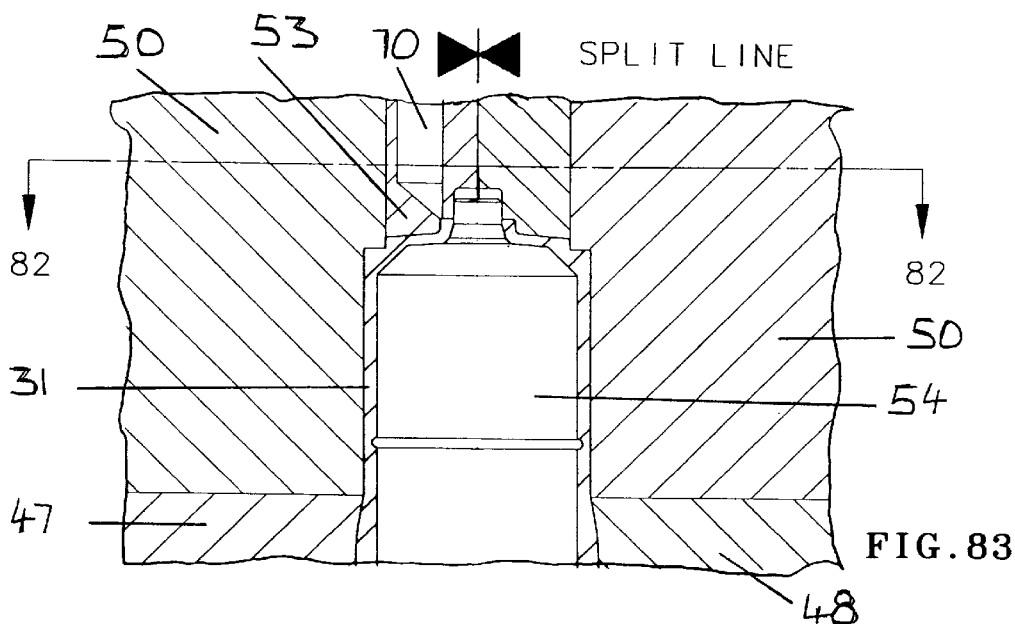
FIG. 83 is a fragmented sectional view of FIG. 82.

FIGS. 82–83 illustrate a further method of injecting the plastic melt in to the parison 31. In this embodiment the material is injected into the top edge of the dispensing orifice boss 36 and the dispensing orifice 13 is located on the centre line of the core rod. The sprue runner 70 is located in one of the sprue bush ring halves 53. The aim of this arrangement is to achieve a more even material flow path around the circumference of the parison so that no join lines occur, although for polypropylene this is unlikely to be a problem as it is one of the best flowing plastic materials. Alternatively the sprue could be at right angles to the core rod and positioned on the top edge of the dispensing orifice boss 36 or indeed at any other point along the length of the parison. In another arrangement the core rod can be used to inject the material through to the parison, either through the end of the core rod or at one or more points around the circumference.

Figure 84:
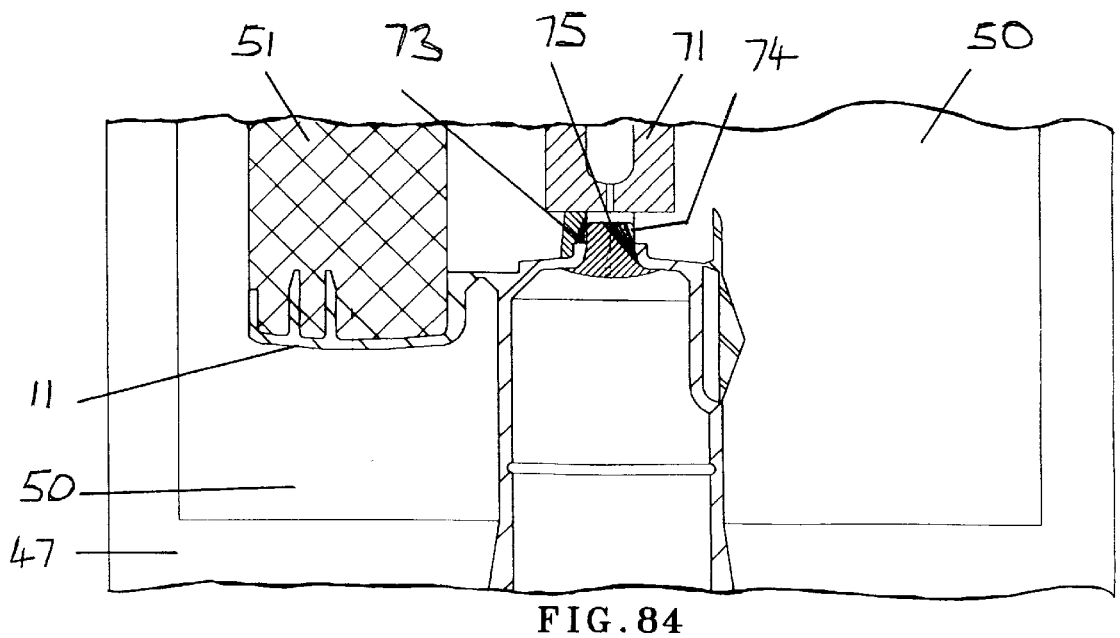
FIG. 84 is a fragmented sectional plan view of another embodiment showing a different method of injecting plastics into the parison tool.

FIG. 84 shows a further method of injecting the plastic melt into the parison 31. In this case the dispensing orifice 13 is on the centre line of the core rod, the sprue bush 71 stops short of the dispensing orifice boss 36 and the channel for the core rod through the dispensing orifice continues through to the sprue bush 71 and forms Authorised Representativesmall circular or cone shape cavity 72. Three channels are shown representing different methods of introducing the melt into the boss 36 with the aim of producing an even melt flow around the parison. The three methods are versions of tunnel or submarine gating. Channel 73 is a hole from the sprue cavity 72 to the outer edge of the dispensing orifice boss 36. An alternative method is represented by channel 74 where slot or scallop projects from the top tip of the core rod through to the dispensing cap to the inside top of the dispensing orifice boss 36. A further method is represented by channel 75 which passes through the tip of the core rod to the inside lower edge of the dispensing orifice 13. Each of these methods are likely to have two to four evenly spaced channels in a radius pattern around the centre of the core rod. It may be necessary after every shot to clean away from the sprue cavity or core rod any hardened plastic material that may be left behind.

Polypropylene has a very good flow and weld line characteristics. However, a further way of ensuring that the melt flow of the parison is undisturbed is to mould the parison without a dispensing orifice. The dispensing orifice may then be cut out in a secondary operation which could be performed at the same time as the dispensing cap is closed and the tear tab is welded in place.

Figure 85:
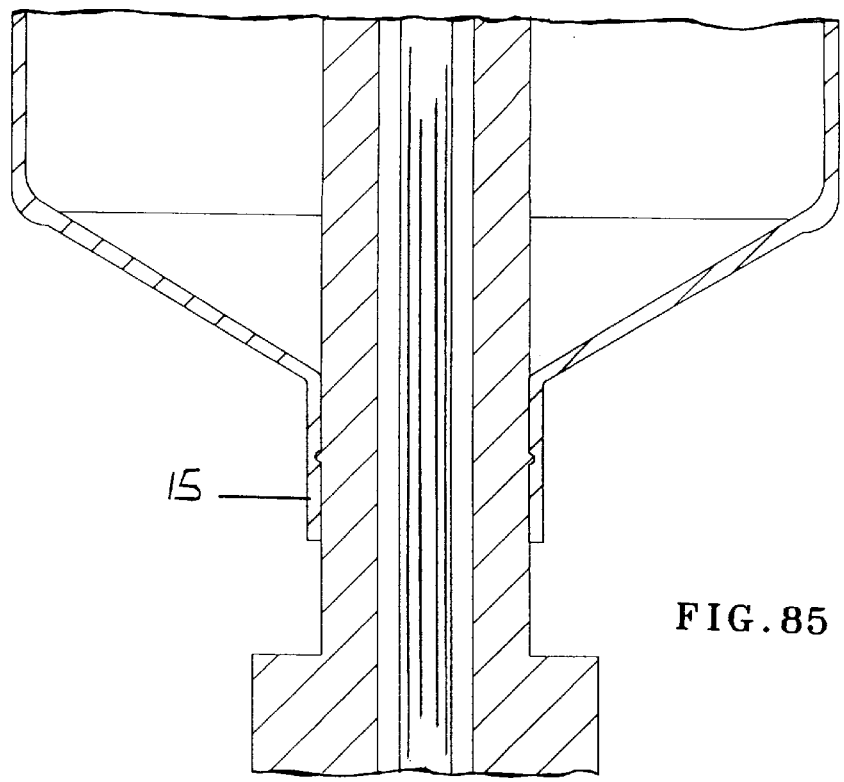
FIG. 85 is a fragmented view showing the core rod without a step at the base.

FIG. 85 shows a core rod which does not have a shoulder at the end of the filling tube 15. This allows the finished container to be pushed off the core rod by directly engaging the edge of the filling tube.

Figure 86:
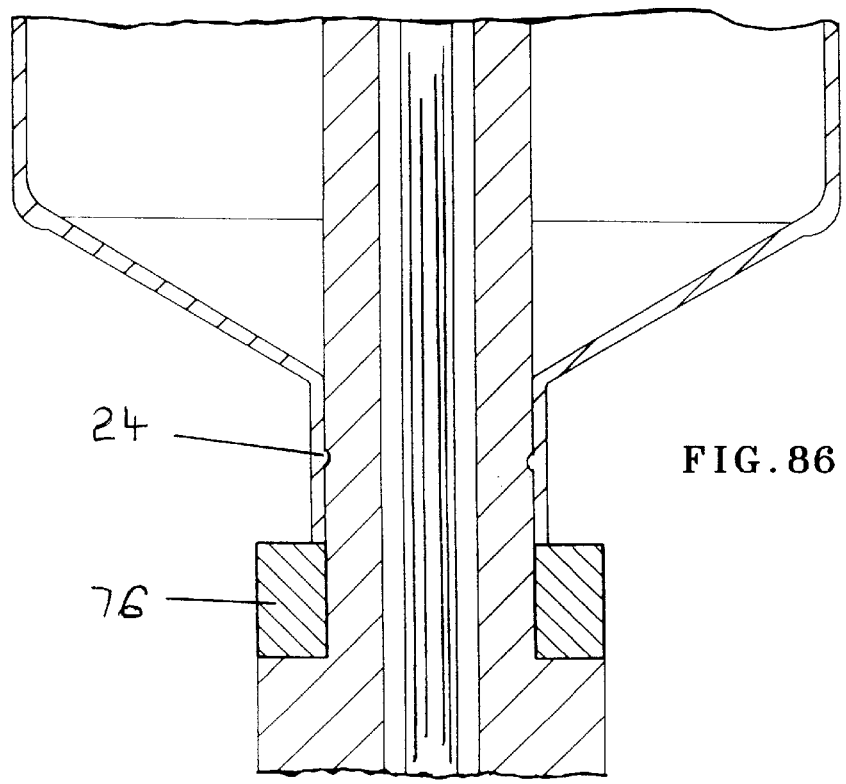
FIG. 86 shows the same embodiment as illustrated in FIG. 84 but has a movable sliding stripping sleeve to aid the removal of the container from the core rod.

FIG. 86 shows an arrangement similar to that shown in FIG. 85 but where a stripper ring 76 is located on the core rod and slides up to push the finished container off the core rod. In this case the blow-by-grooves 24 are convex not concave.

Figure 87:
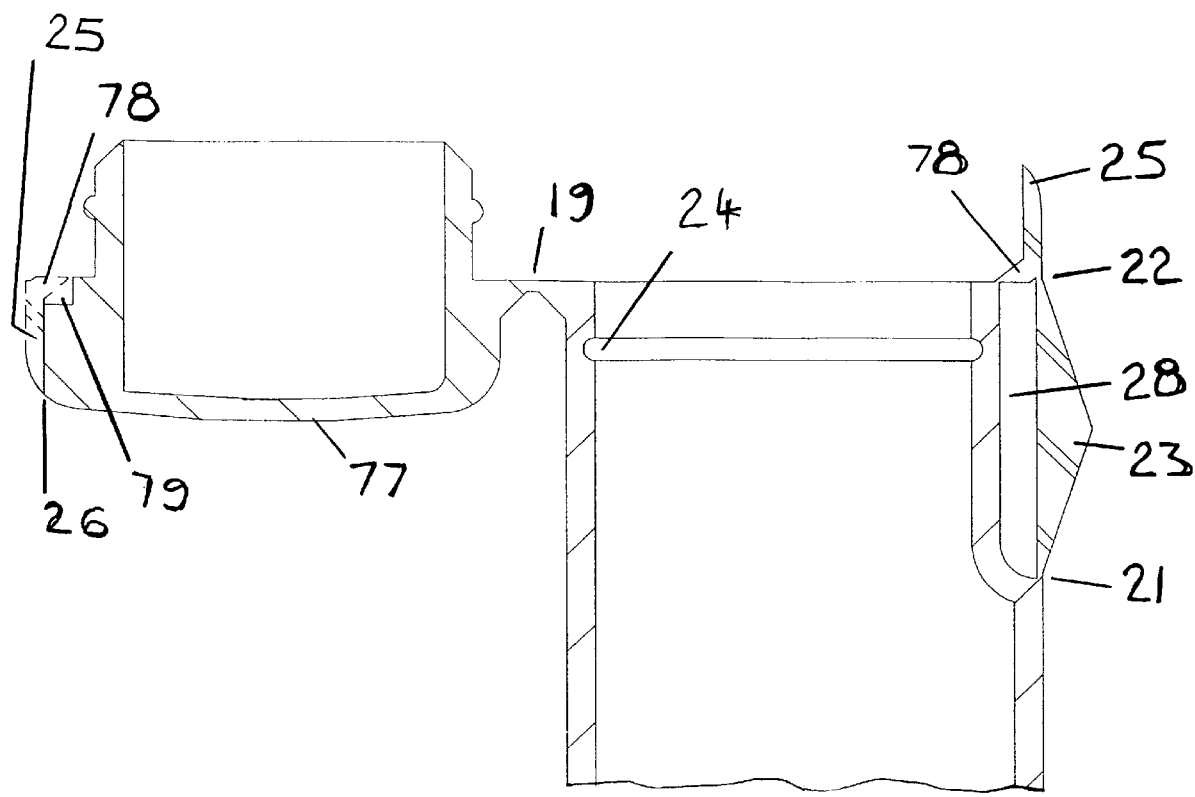
FIG. 87 shows a further fragmented open embodiment in section of the top neck area of a container where the neck of the container is fully opened, that is, no restricting dispensing orifice is provided, the full core rod shape penetrates through into the parison tooling and the integral dispensing cap cooperatingly seals in the blow by-grooves, the tear tab support point being positioned within a recess in the dispensing cap and the part which remains after the sealed container is opened being shown dotted.
Figure 88:
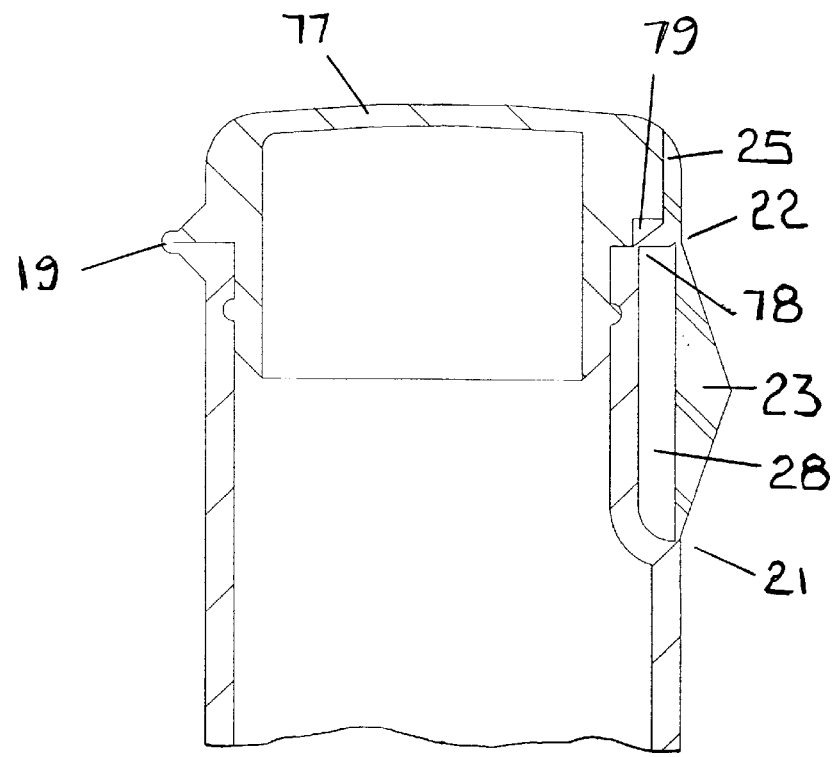
FIG. 88 shows the container of FIG. 87 in the closed state.

FIGS. 87–88 illustrate a further embodiment in which no top ledge 27 or restricted dispensing orifice 13 is provided. It is thus an open top, double orifice integral container. A dispensing cap 77 is provided with sides which mate with the 'D' shape of the inside of the neck resulting from the provision of a finger access area 28. A cooperating boss is provided to seal in the blow-by-groove. A tear tab arrangement is provided in which a cone shaped tear tab flap support tear point 78 projects down to a pin point and is attached centrally to the top edge of the flat finger access area 28. Once the tear point 29 is broken, it forms the surface where the sealing cap is opened from and is located in a recess or slot 79. FIG. 87 shows the sealing cap 77 open while those portion of tear flap 25 and tear tab flap support 78 that remain after the tear tab 23 has been removed from tear points 21 and 22 and the sealing cap 77 opened are shown in phantom.

Figure 89:
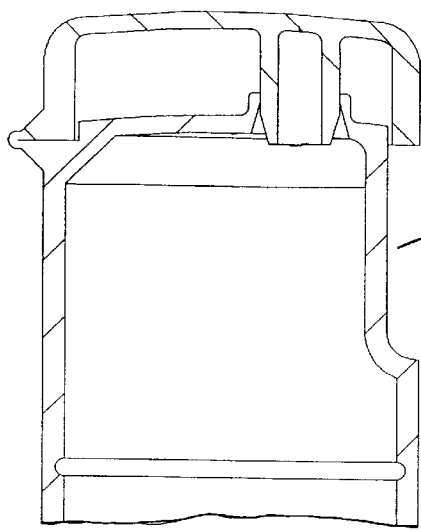
FIG. 89 is a fragmented top neck sectional view of a further embodiment without the tear tab option.

FIG. 89 illustrates a further embodiment in which a tear tab is not used. The flat surface on the front of the dispensing cap is therefore not required.

Figure 90:
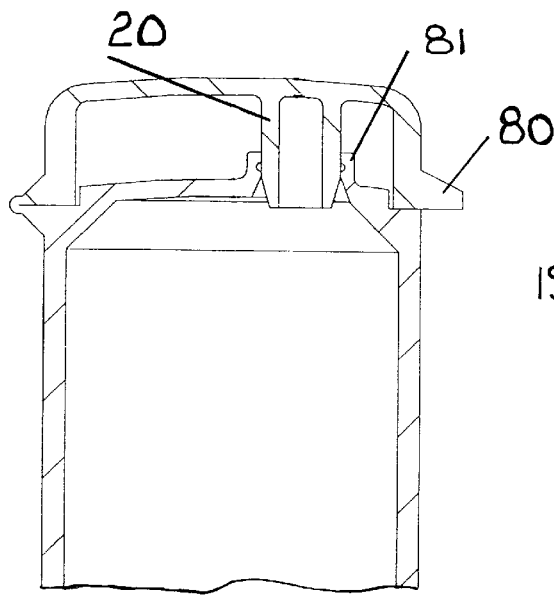
FIG. 90 is a fragmented top neck sectional view of a further embodiment without both the finger access area and the tear tab option but with the neck blow-by-groove positioned in the dispensing orifice and a tab extension on the dispensing cap to aid cap opening.

FIG. 90 illustrates a further embodiment in which neither a tear tab or a finger access area are provided, instead to open the sealing cap a tab extension 80 is provided and small blow-by-grove 81 is provided on the inside diameter of the dispensing orifice 13 to stop air from escaping at the blow station.

Figure 92:
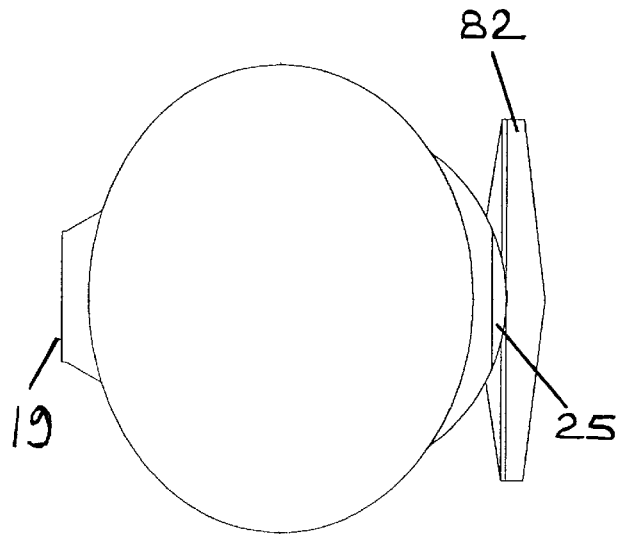
FIG. 92 is a top plan view of FIG. 91.
Figure 91:
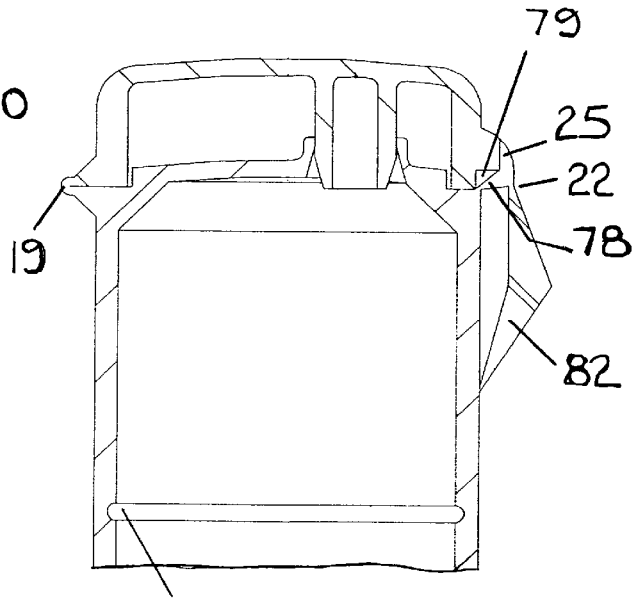
FIG. 91 is a fragmented top neck sectional view of a further embodiment, similar to that shown in FIG. 90 but which is elliptical in top plan view, without the dispensing orifice blow by grooves and with a tear tab.
Figure 93:
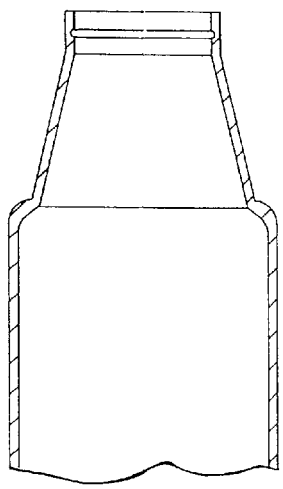
FIGS. 93–98 show front and side cross sectional views of a further method of forming the bottom of the container at three stages—opened, sealed and pushed into the base.
Figure 94:
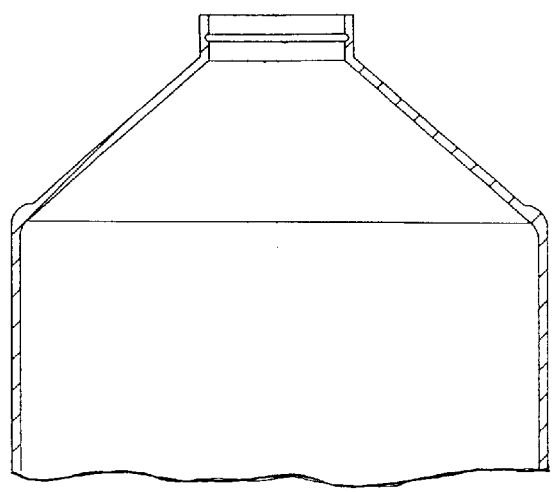
Figure 95:
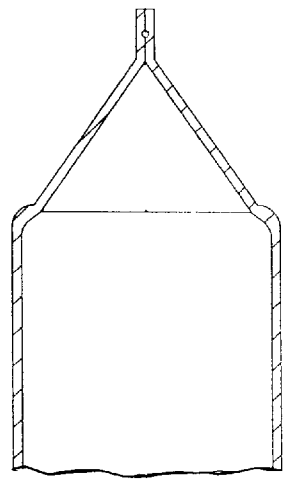
Figure 96:
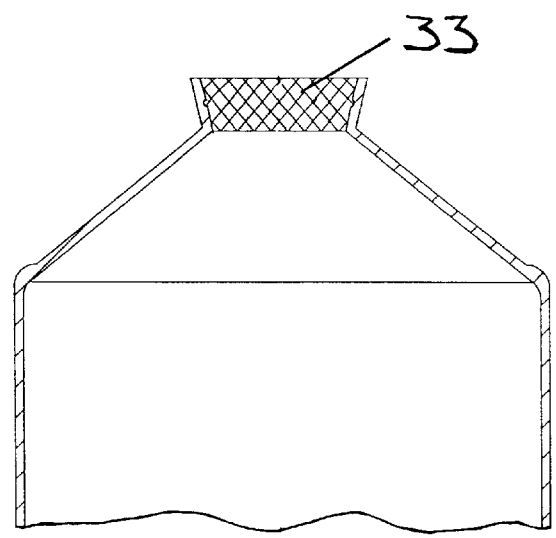
Figure 97:
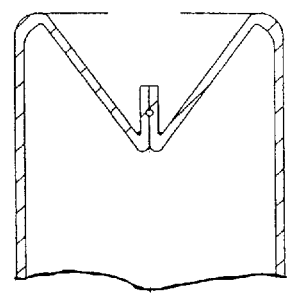
Figure 98:
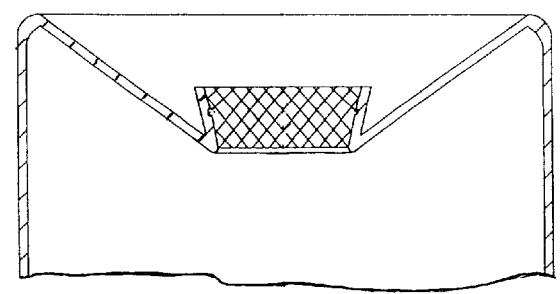
Figure 101:
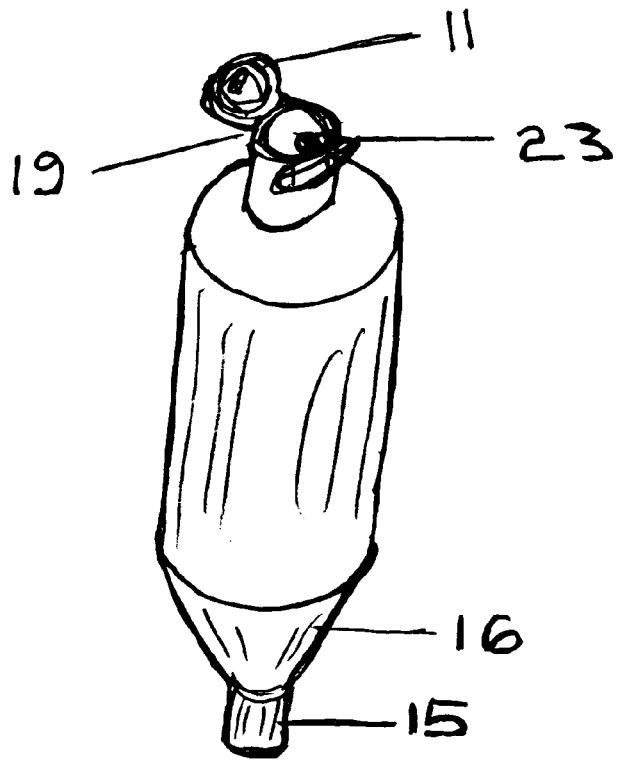
FIG. 101 is a perspective view of a round container as first manufactured in the open state with the dispensing cap open, tear tab in place and filling tube open.
Figure 102:
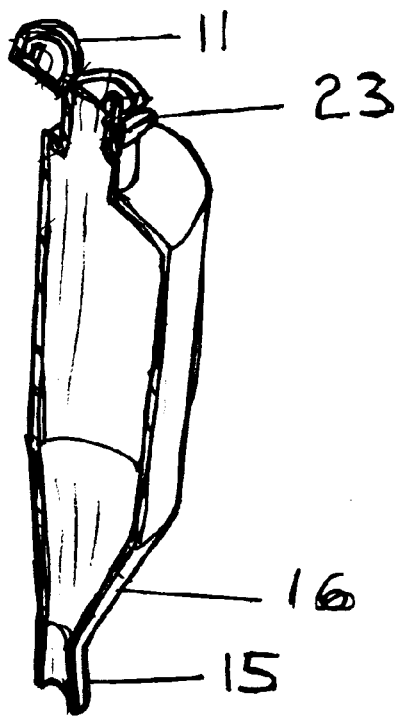
FIG. 102 is a perspective sectional view of FIG. 101.
Figure 103:
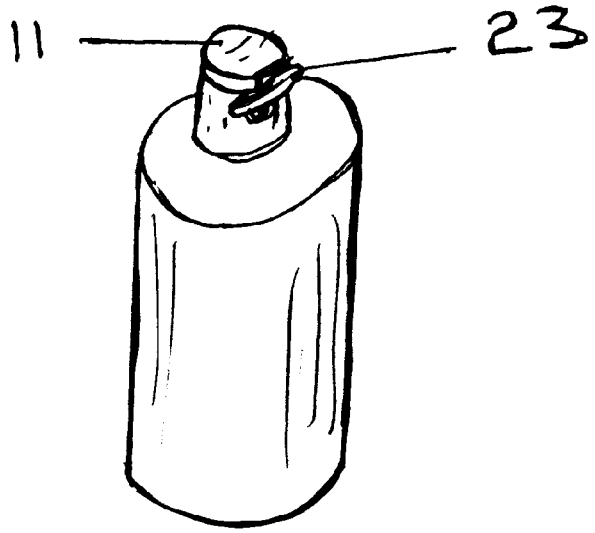
FIG. 103 is a perspective view of FIG. 101 with the dispensing cap closed, and the filling tube sealed and pushed into the base of the container.
Figure 104:
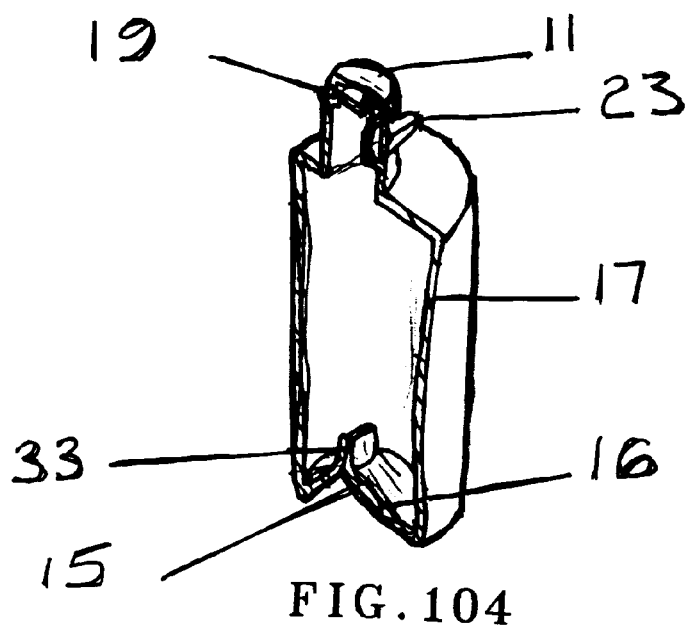
FIG. 104 is a perspective sectional view of FIG. 103.
Figure 105:
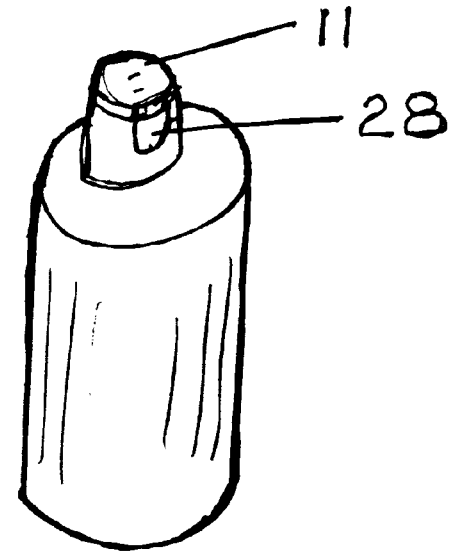
FIG. 105 shows the container of FIG. 103 but with the tear tab removed.
Figure 106:
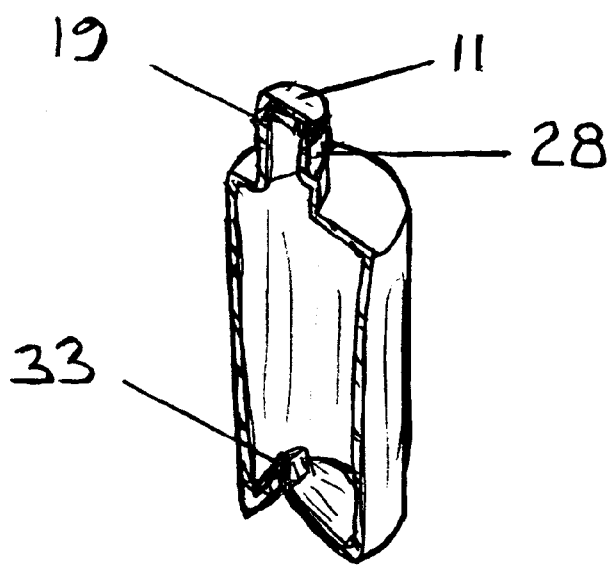
FIG. 106 is a perspective sectional view of FIG. 105.
Figure 107:
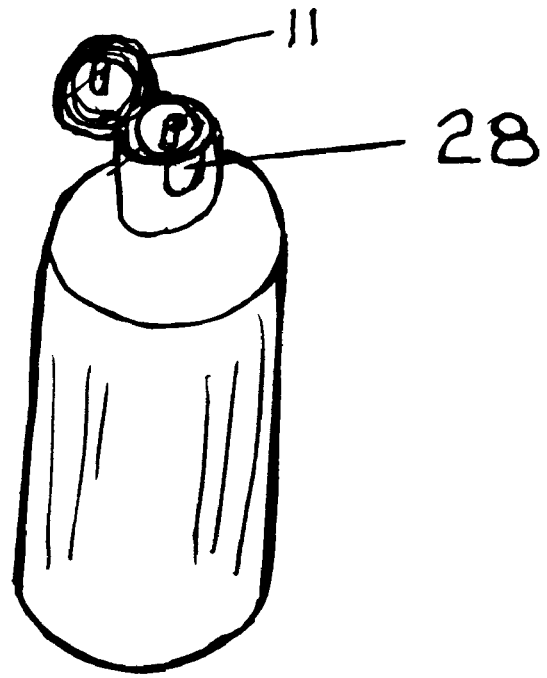
FIG. 107 shows the container of FIG. 105 but with the dispensing cap open.
Figure 108:
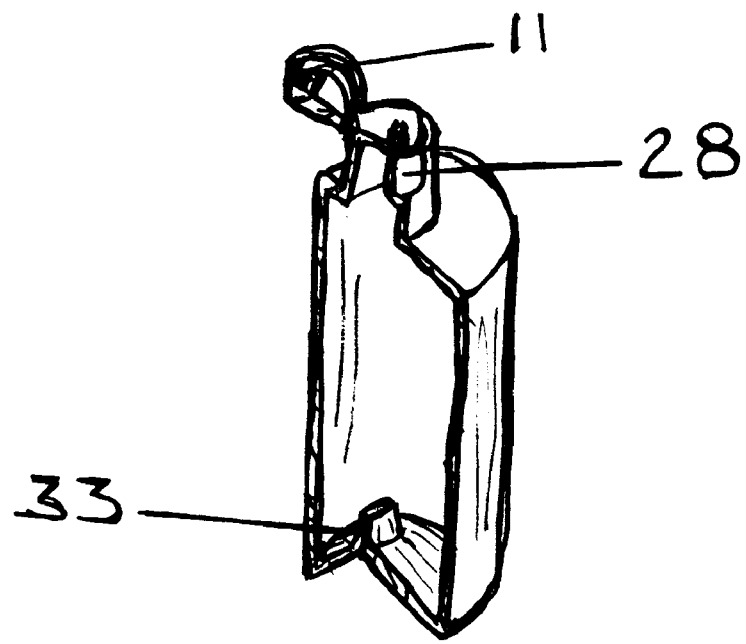
FIG. 108 is a perspective sectional view of FIG. 107.

FIGS. 91–92 show a further embodiment similar to that shown in FIG. 90 in which a tear tab arrangement is used and the neck is elliptical in top plan view (see also FIG. 92.). The tear tab 82 projects up at an angle from lower attachment tear point 21 positioned centrally at the front of the container neck. The top section of the tear tab is similar to that of FIGS. 87–88 where the tear tab flap 25 is attached to a flat surface on the dispensing cap opening tab extension.

FIGS. 93–98 show the sequence of sealing and pushing in the filling tube by another method in which the filling tube is pushed into the base of the container from the bottom edge of the sealed area 33.

FIG. 99 illustrates a straight sided embodiment which has a kink 83 in the wall section at what will be the bottom edge of the container after the walls have been folded and sealed into the container base. This container can be formed by injection blow moulding without the use of a blow tool or by injection moulding. FIG. 100 shows the container in the sealed condition with the previously open base forced into the base of the container and sealed in either in a line, star or shot gun cartridge patten. In this embodiment some creasing and folding the walls is to be expected. Alternatively, a straight sided contained may be sealed with a separate push-in, base sealing-plug in which case the kink 83 is not required.

FIGS. 101–108 illustrate various perspective and sectional views of the different stages of manufacture of an integral, double orifice container of circular cross-section having a dispensing cap and tear tab.

Figure 109:
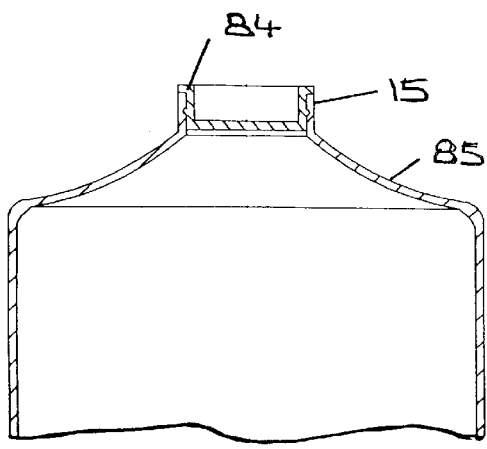
FIG. 109 is a fragmented lower sectional view of a further embodiment of an inverted container in which a separate moulded plastics plug is used to seal the filling tube and where the side walls that form the cone are concaved.
Figure 110:
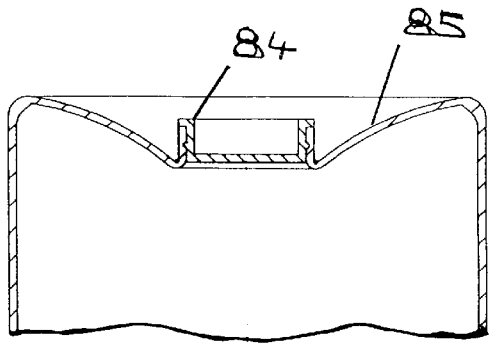
FIG. 110 shows the embodiment of FIG. 109 where the sealing plug is pushed into the base of the container.

FIGS. 109–110 illustrate a further embodiment in which the filling tube 15 is sealed with a separate cap 84 and the walls of the cone 16 are concave 85. This is to aid the spiring-in effect when the filling tube is pushed into the base of the container. The use of a cap allows the container to be reopened and refilled. The cap may have an integral hook so that the cone and tube can be easily pulled out from within the base of the container.

Figure 111:
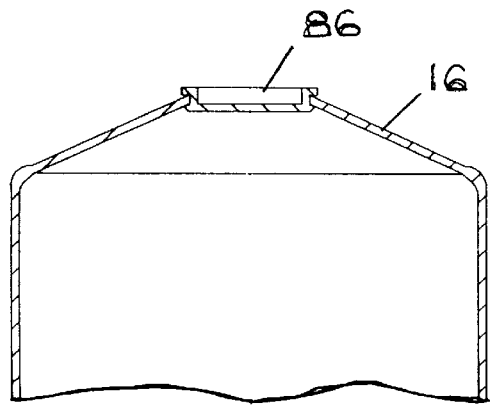
FIG. 111 is a fragmented sectional view of a further embodiment where there is no filling tube on the cone and the container is sealed with a separate double lip sealing plug.

FIG. 111 shows a further embodiment in which a filling tube 15 is not provided. The sides of the cone are straight and a double lip cap 86 seals the cone 16.

Figure 112:
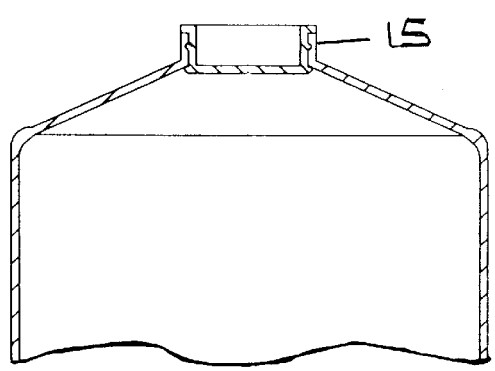
FIG. 112 is a fragmented sectional view of a further embodiment where a separate double lip sealing plug is used to seal on the filling tube.

FIG. 112 shows a further embodiment in which a separate double lip cap is used for sealing the filling tube 15.

Figure 113:
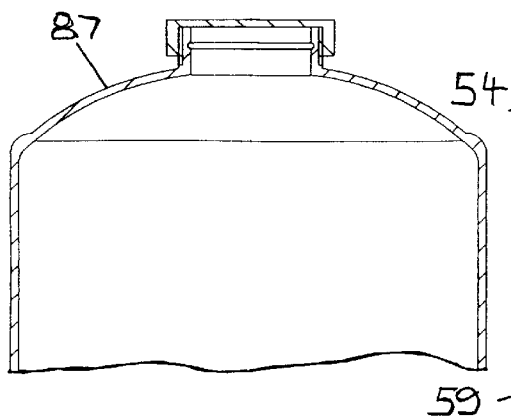
FIG. 113 is a fragmented sectional view of a further embodiment where a threaded closure seals on a mating thread on the outside of the filling tube.

FIG. 113 shows a further embodiment in which a screw cap is used to seal the filling tube and the cone walls are of convex shape 87. This again is to aid the spring-in effect when the filling tube is pushed into the container base.

FIGS. 111–113 show the cone in the up position. In all these embodiments the cone is pushed into the container base in subsequent operations.

Figure 114:
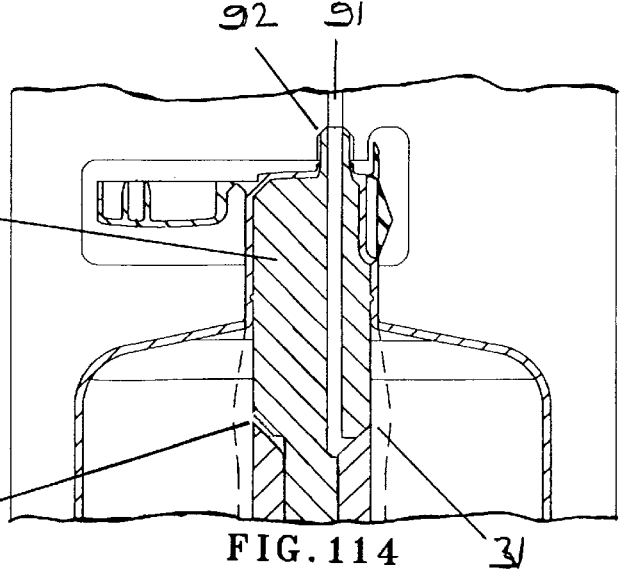
FIG. 114 is a fragmented sectional view of a further embodiment showing a method for compressed air entry through the tip of the core rod and passing through the dispensing orifice to the parison.

FIG. 114 illustrates a further method of introducing compressed air into the parison 31. In this embodiment air enters through a channel 91 in the tip of the core rod that passes through the dispensing orifice. The channel mates with a recess in the cone shape of the air entrance 59 to the parison. The tip of the core rod extends into the blow cavity and seals via a cone shape 92. The cones are sealed by pressure exerted from the core rod air shaft. The advantage of this system is that compressed air does not have to pass through the moving or indexing head on which the core rod is mounted and gives greater rigidity.

Figure 115:
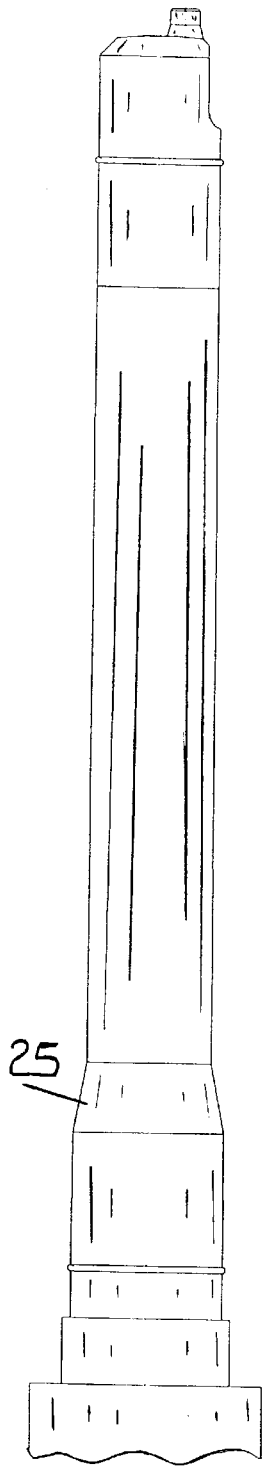
FIG. 115 is a further embodiment showing a stepped core rod.

FIG. 115 shows a core rod which is steeped in a region indicated by reference numeral 90 prior to the filling tube. This has the advantage that containers can be withdrawn from the core rod with less resistance.

Figure 116:
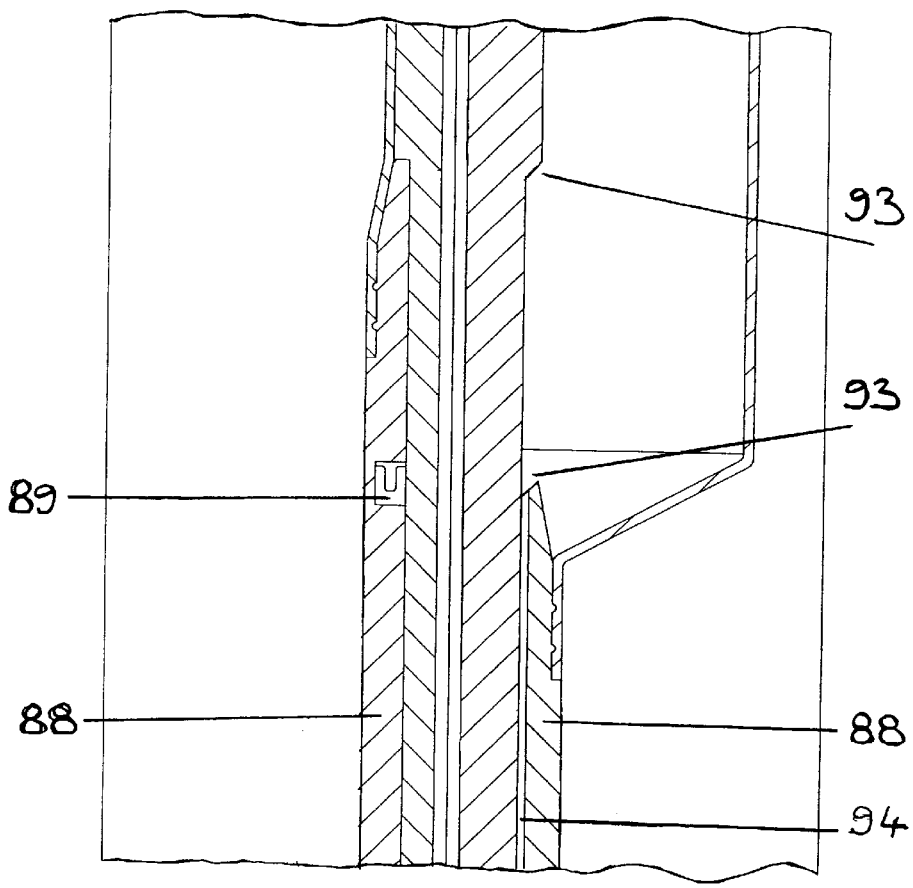
FIG. 116 is a fragmented part sectional view of a further method of stretching the parison.

FIG. 116 illustrates a further method of stretching the parison lengthways for the injection stretch blow moulding process. In this case the lower end of the parison is stretched out by a core rod ring 88, which slides along a step on the core rod body. The left hand half of FIG. 116 shows the parison moulded in the parison tooling and in this option compressed air is passed down the centre of the core rod as is standard practice, where a seal 89 is provided. The right hand half of FIG. 116 represents the blow tool in which the parison has been stretched out and blown. In this operation the compressed air enters through grooves 94 on the inside diameter of the core rod ring 88 and the core rod is solid giving greater rigidity. The compressed air seals on the cone shape 93. Two or more blow-by-grooves are provided to ensure that the filling tube grips the core rod ring. The ring can be moved back and forth by any mechanical means such as hydraulic, rack and pinion or lever arm means. It may be necessary to grip the filling tube of the parison by mechanical means to ensure that it does not slide off the core rod ring 88 when being stretched out.

In a further embodiment a neck portion including an integral dispensing cap, tear tab and cap spring feature may be moulded separately and attached to the neck of an extrusion blow moulded container. Extrusion blow moulded containers lend themselves well to the use of multi-layers. Injection blow moulding can also form multi-layer containers but additional tooling stations are required.

An additional advantage of attaching a separate closure to an extrusion blow moulded restricted neck or non restricted neck double orifice container is that the tooling is less costly than for injection blow or injection stretch blow moulding. To produce a double orifice extruded bottle as per FIG. 2 or FIG. 118 but without the integral closure, the extruded tube parison is not pinched together and sealed at the bottom as is normal. Instead both parison ends are kept open with mandrels while the container is blown. Either the top or bottom mandrel may comprise the blow tube while the opposite may comprise the plug to stop air escaping. The filling tube can either be position outward or up inside the base. In a further option the closed separate closure is automatically positioned in the blow tooling and acts as the sealing mandrel. The hot parison tube is blown from the bottom mandrel and the side walls of the parison are forced in position against the closure side walls forming a seal and securing the closure to the blown body of the container. This streamlines the process and reduces cost.

It is advantageous to have the sprue and runner system in the immediate area of the dispensing cap and tear tab arrangement. It is here that the main restrictions are; namely the living hinge for the dispensing cap and the tear tab tear points for the tear tab assembly. It is much easier to fill the restricted areas of a cavity with a fast moving and hot melt in a hot region of the tool. The further the melt flow is away from the injection point the slower it moves and the cooler it gets. Hence the harder it gets to fill restricted flow areas.

It is to be noted that a container having an integral, non-restricted neck top portion, a straight sided body portion and a bottom portion with cone and filling orifice will, when closed and standing upright, give the visual impression that the container is an injection moulded straight sided container.

A further embodiment is shown in FIGS. 117–120 on which the bottom portion consists of a cone 16 and a circular filling tube 15 which is moulded up inside the base of the container. In this case the top portion is of circular cross-section while the container 95 is oval and has a stepped out base portion 96 to accommodate the bottom portion in the minor axis. The dispensing cap 97 is orientated on the major axis, but any orientation is possible. The tear tab and cap spring are optional features. In this case the cap spring feature consists of a hook shaped protrusion 98 which projects from and is integral with the top portion. The protrusion 98 arches over the dispensing cap hinge 19. The underside surface 100 of the spring tab 98 defines a cam profile with the centre of the cam profile being about the hinge centre 19. The spring tab also has an apex point 117 which aids the engagement of a hole 99 in the dispensing cap 97 with the tab 98.

The purpose of this feature is to provide the dispensing cap closure with an increasing and decreasing resistance in a spring-like manner when it is pivoted open and closed and to ensure that the cap does not swing freely closed from an open position when contents are being dispensed from the container and the container is inclined at a pouring angle.

In this case this is achieved by a hole 99 provided in the integral dispensing cap 97 and positioned adjacent the dispensing cap hinge area. In use an edge of the hole 118 cooperatively and progressively interferringly mates in a cam-like manner with the cam surface 100 of the protruding spring tab 98. To ensure that the mating surfaces do not engage on a point line of contact, the back of the dispensing cap is flat over the width of the tab.

As the dispensing cap is opened, resistance is gradually encountered. Interference between the projecting cam shaped tab undersurface 100 and the mating dispensing cap surface 118 increases to a maximum and then to zero. After the maximum point of resistance has been encountered, the cap will spring open of its own accord. When the cap is pivoted closed, resistance is again gradually increased until the maximum point is reached. The cap will then spring closed of its own accord. The cap must however be pressed in further to ensure that the cooperating boss on the dispensing cap mates within and seals the dispensing orifice.

The cam-shape can either be provided on the top surface of the projecting tab, on the underside surface or on either side of the tab and may be arranged to engage the corresponding edge or edges of the cooperating slot or hole in the dispensing cap. Alternatively, the protruding tab can be positioned on the dispensing cap closure in which case the corresponding hole, slot or pocket may be provided in the container top portion. The spring tab generally projects outside the surfaces of the closed dispensing cap.

Figure 121:
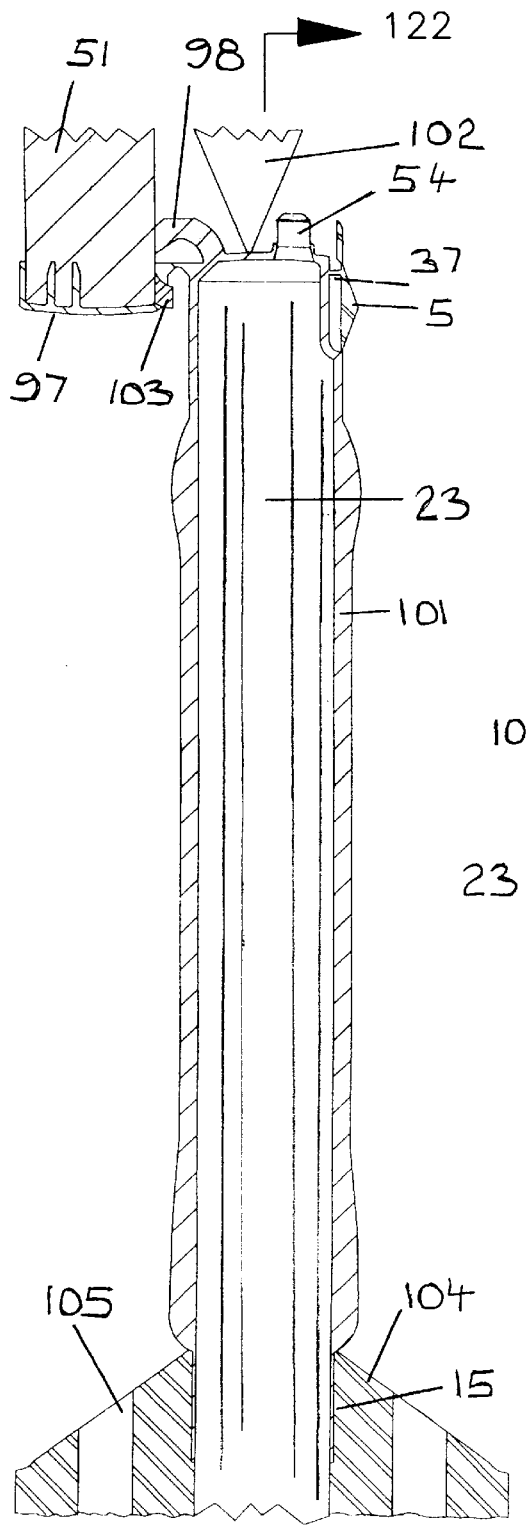
FIG. 121 is a part diagrammatic top plan sectional view of a cavity in the injection stage of the Gussoni method for forming a parison having a dispensing cap, tear tab and cap spring feature and in which the bottom portion will be moulded up inside the base of the container, the top half of the parison tooling being removed for clarity.
Figure 122:
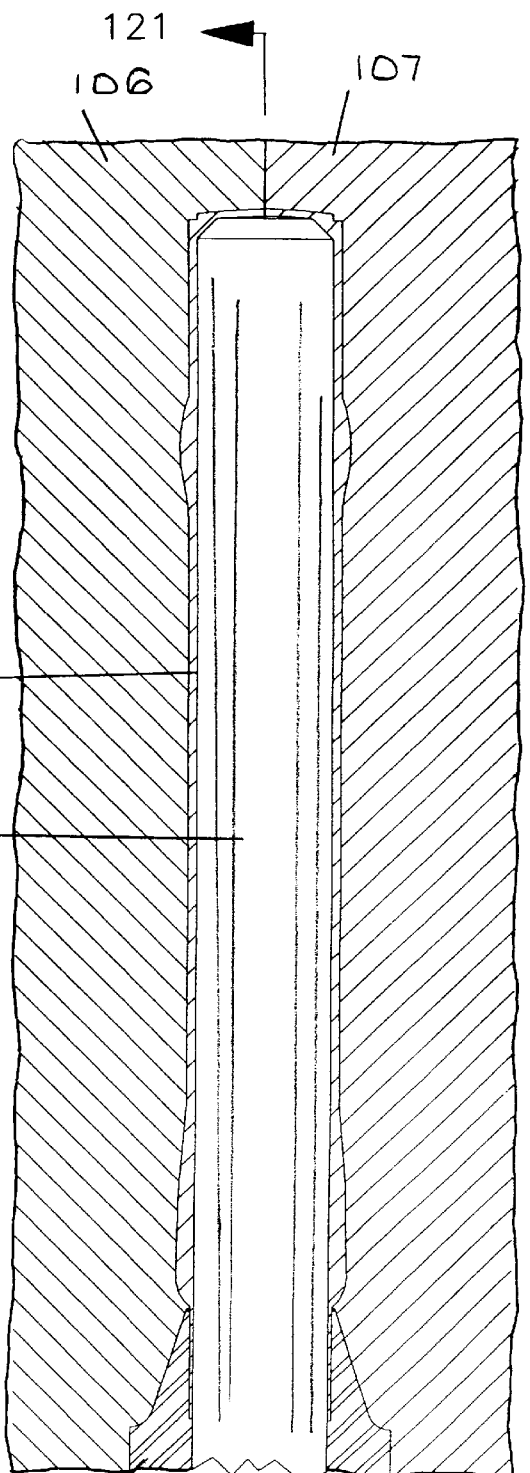
FIG. 122 is a side sectional view of FIG. 121.

FIGS. 121–122 show diagrammatically the tooling necessary to produce the parison for the container shown in FIGS. 117–120. The tooling is much the same as previously described in relation to FIGS. 66–68 except for the forming of the bottom portion which is moulded up within the container base. The tooling comprises left hand or bottom parison cavity 106 and right hand or top parasion cavity 107. However, carried on the core rod 23 is a bottom plug core 104 which forms the filling tube 15. An additional tooling feature is the provision of a dispensing cap hole core 103 attached to the top parsion tool half 107 (not shown for clarity). In this case the dispensing cap core 51 would have a flat area at the back of the cap to mate at a five degree shut off angle with the dispensing cap hole core 103. In another arrangement the bottom plug core 104 need not be incorporated into the upper and lower parison cavities but could instead be brought forward into position at the blow station. The top of the core rod is of 'D' shaped cross section to accommodate the finger access area.

Figures 123, 124:
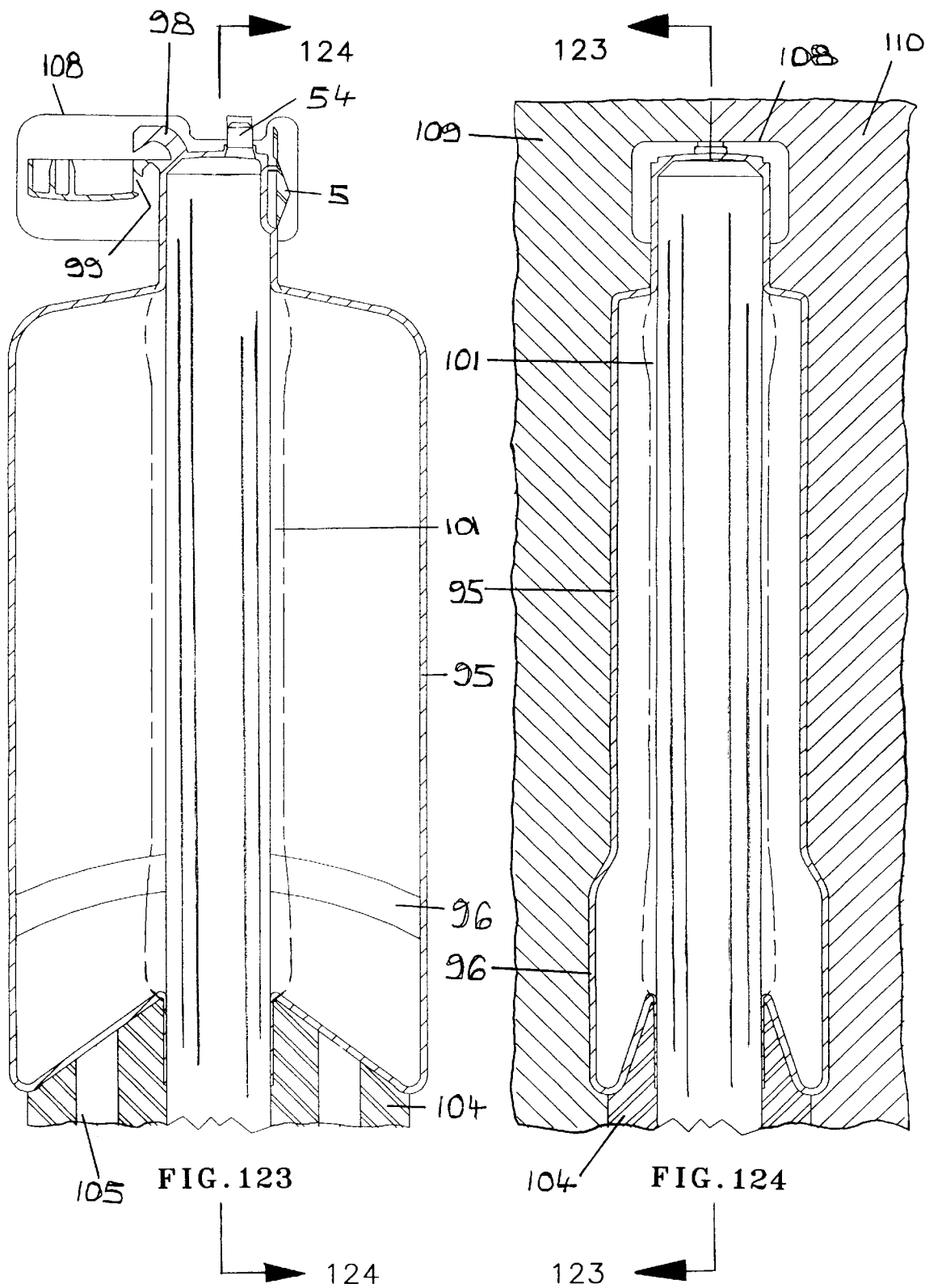
FIG. 123 is a part diagrammatic top plan sectional view of a cavity of the blow stage of the parison of FIGS. 121–122, the section being on the major axis of the container, the top half of the blow tooling being removed for clarity.
FIG. 124 is a side sectional view of FIG. 123.
Figure 125:
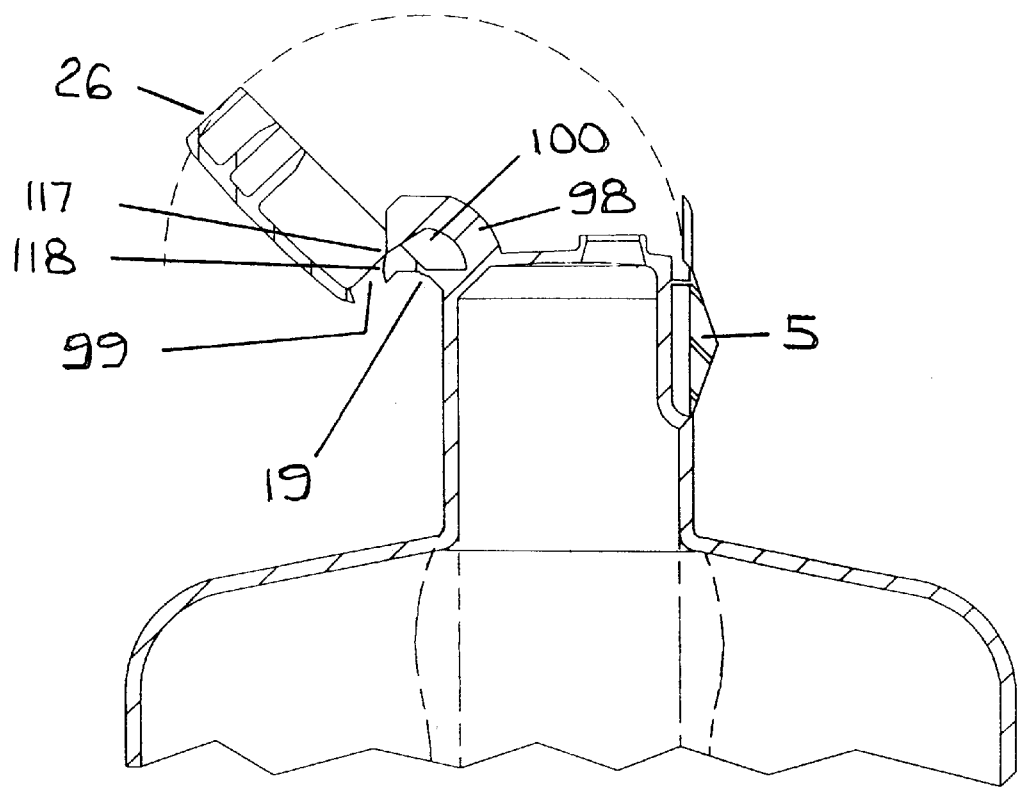
FIG. 125 is an enlarged fragmented sectional view of the top portion of FIG. 118, in which the edge of the hole in the dispensing cap just engages the bottom surface of the protruding spring cam tab, the tab being hook shaped and positioned adjacent Authorised Representativefull length film hinge.

FIGS. 123–124 show diagrammatically the blow mould tooling necessary to produce the container shown in FIGS. 117–120. Again the tooling is much the same as previously described in FIGS. 69–71 except for the forming of the bottom portion. The tooling comprises left hand or bottom blow cavity 110, right hand or top blow cavity 109 and bottom plug core 104 and includes ejector pins 105. When air is entered into the parison the container walls are forced against the walls of the cavities 109, 110 and 104 to form the container. The blown container is ejected off the core rod by means of the ejector pins 105.

Figure 126:
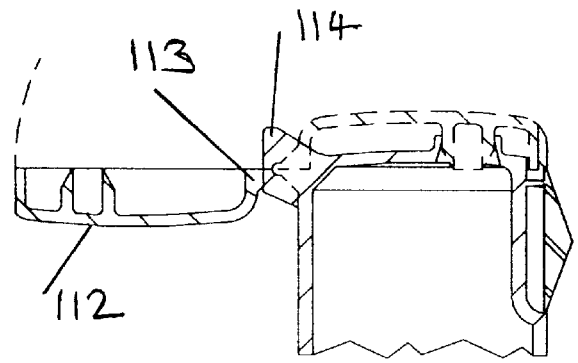
FIG. 126 is a top portion sectional view of another embodiment of the cap spring feature in which the slot in the dispensing cap engages the top surface of the protruding cam tab which is partly level with the film hinge, one film hinge being positioned on either side of the tab, the sealing cap being shown open in full line and shown closed in phantom.
Figure 127:
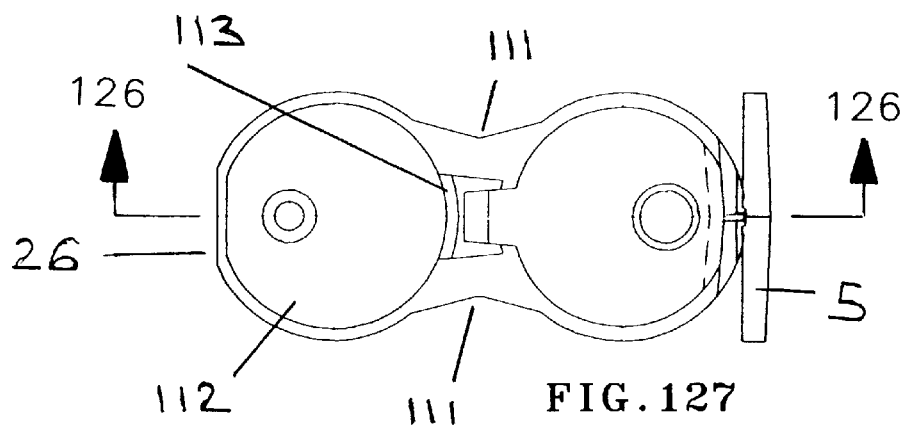
FIG. 127 is a top plan view of FIG. 126.

FIGS. 126–127 show a further cap spring method in which the dispensing cap has film hinges 11 positioned on either side of a tab 114 which protrudes from the side and top of the top portion. A cam-shaped surface is provided on the top of the tab which mates with the edge of a slot 113 provided in the dispensing cap 112. The spring affect is produced in the same manner as previously described in relation to FIGS. 117–120 and FIG. 125. The tab generally protrudes past the hinge and outside the closed dispensing cap.

Figure 128:
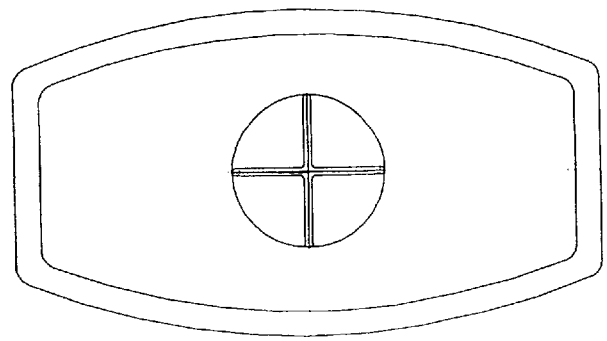
FIG. 128 is a top plan view of the underside of a further embodiment of the bottom portion where the filling tube is sealed in a star patten.

FIG. 128 shows in top plan view a bottom portion in which the filling tube has been sealed in a four point star patten. It is to be noted however, that any other sealing method is possible.

Figure 129:
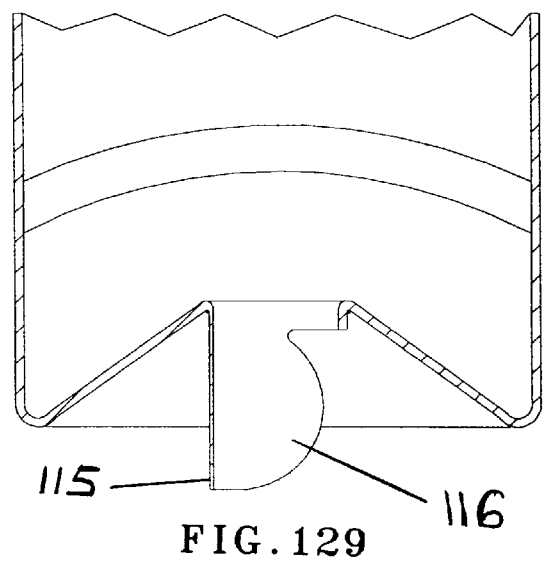
FIG. 129 is a sectional view of a further embodiment of the bottom portion where the filling tube comprises Authorised Representativeflap which is sealed closed.

FIG. 129 shows the filling orifice tube 116 cut away to provide a flap which can be folded over in an origami-like fashion and welded in place to form a seal. 'Vee' slots 115 are provided to aid the folding and prevent the material from creasing.

Figure 130:
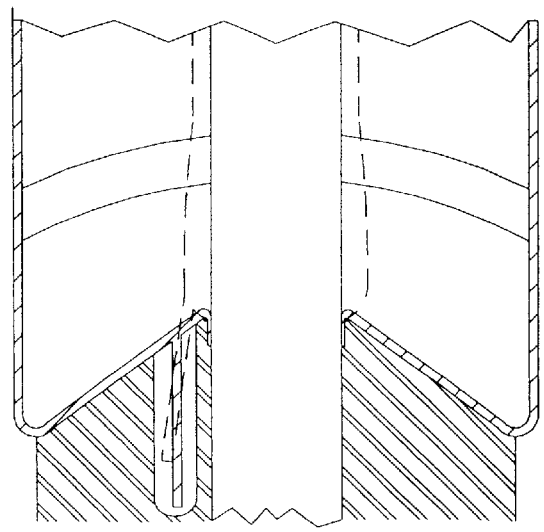
FIG. 130 shows a method of producing a filling orifice flap.

FIG. 130 shows a blow station capable of accommodating a parison in which a filling orifice sealing flap has been formed. After the container is filled the flap is folded over and sealed in place.

It will be apparent to those skilled in the art that a container in accordance with the present invention may be of any size, shape or use. It may be formed of any material type including card and may comprise any number of compartments. Where applicable the concepts described can be applied to any integral or non integral container having either a single or double orifice. In particular any feature or combination of features from any of the described embodiments can, where applicable, be used to form any non specifically described container or component.

We claim:

1. A container for storing and/or dispensing a substance, the container defining a dispensing orifice and a filling orifice spaced from said dispensing orifice, said filling orifice being defined by a neck portion of reduced cross section which is formed integrally with the container and connected thereto by a wall portion, the wall portion including an inwardly directed tapered cone section that is formed integrally with the sidewall of the container and extends into a base of the container for recessing said filling orifice into the container so that the container may stand on its base, said wall portion being adapted so as to facilitate a spring-in action of the wall portion that prevents the neck portion and the wall portion from being forced back out of the container base in normal use; the filling orifice being permanently sealed following the introduction into the container of the substance to be stored and/or dispensed.

2. A container in accordance with claim 1, wherein the wall portion is a tapered cone section that is formed integrally with the sidewall of the container, and wherein the intersection of the tapered cone section and the neck portion deviates from a subtended arc drawn from the intersection of the base of the cone section and the sidewall of the container.

3. A container in accordance with claim 1, wherein the dispensing orifice is provided with a closure that is formed integrally with the container.

4. A container according to claim 1, including a body portion and a closure portion, both the body portion and the closure portion having respective split lines, the split line on the body portion being at a right angle to the split line of the closure portion.

5. A container in accordance with claim 1, wherein the filling orifice is formed in situ with the neck portion and the wall portion recessed within the container.

6. A container in accordance with claim 5, wherein one or more walls of the container are stepped radially outwardly in a region proximate the filling orifice so as to accommodate the recessed nature of the neck portion and the wall portion.

7. A container in accordance with claim 1, wherein said filling orifice is larger than said dispensing orifice.

8. A container in accordance with claim 7, wherein the filling orifice is closed by the receipt of a plug within the neck portion prior to sealing.

9. A container in accordance with claim 7, wherein the container is of substantially elliptical or frusto-elliptical cross section, and wherein the neck portion is flattened prior to sealing the filling orifice to define a rectilinear sealing area.

10. A container in accordance with claim 7, wherein the neck portion is flattened prior to sealing the filling orifice in such a way as to define a star-shaped sealing area, the star-shape having three or more points.

11. A container according to claim 1 and including a dispensing cap defining said dispensing orifice a closure means for closing the dispensing orifice, and a tear tab formed integrally with the container and connected thereto by a frangible tear point, the tear tab being so arranged as to partially overlie a surface of the closure means when said closure means is in said closed position thereby enabling the tear tab to be joined to the closure means to secure the closure means in said closed position, the tear tab being further joined to the dispensing cap by a frangible manufacturing support adjacent the portion which in use is joined to the closure means.

12. A container in accordance with claim 11, wherein the tear tab is provided with a frangible necked portion intermediate the frangible tear point and the frangible manufacturing support such that upon rupturing the tear point and pulling on the tear tab, the necked portion also ruptures to leave the closure means still secured to the dispensing cap in said closed position by means of the manufacturing support thereby necessitating a two stage opening.

13. A container in accordance with claim 11, wherein said manufacturing support is received within a notch provided in the periphery of the closure means when the closure means is in said closed position.

14. A container in accordance with claim 11, wherein the tear tab is recessed within a finger access area provided on the dispensing cap.

15. A container in accordance with claim 1, wherein the wall portion and the neck portion are recessed up into the container prior to filling the container.

16. A container in accordance with claim 15, wherein the filling orifice is sealed after being recessed into the container.

17. A container in accordance with claim 15, wherein the wall portion is joined to a wall of the container at a first shoulder, the first shoulder being so shaped as to define a first point of flexure, and wherein the wall portion is joined to the neck portion at a second shoulder, the second shoulder being so shaped as to define a second point of flexure.

18. A container in accordance with claim 17, wherein the first shoulder is of increased wall thickness.

19. A container for storing and/or dispensing a substance, the container defining a dispensing orifice and a filling orifice spaced from said dispensing orifice, said filling orifice being defined by a neck portion of reduced cross section which is formed integrally with the container and connected thereto by a wall portion, the wall portion including an inwardly directed tapered cone section that is formed integrally with the sidewall of the container and extends into the base of the container for recessing said filling orifice into the container so that the container may stand on its base, said wall portion being adapted so as to facilitate a spring-in action of the wall portion that prevents the neck portion and the wall portion from being forced back out of the container base in normal use; the filling orifice being permanently sealed following introduction into the container of the substance to be stored and/or dispensed; and including a dispensing cap defining said dispensing orifice and a closure means flexibly hinged to the dispensing cap by a film hinge for movement between an open position and a closed position in which the closure means closes the dispensing cap orifice, and a projecting portion provided on one of the dispensing or closure means and adapted so as to be progressively received within an opening provided in the other said dispensing cap and closure means so the closure means is moved towards said closed position, the projecting portion so engaging the means defining the opening as to provide the closure means with a spring-like action for preventing the closure means forming from said open position to said closed position as the container is tilted at a dispensing angle, and the projection portion protruding from the opening provided in the closure means when the closure means is in said closed position.

20. A container in accordance with claim 9, wherein the projecting portion is substantially arcuate and has a center of curvature which lies on or adjacent the axis about which the closure means is flexibly hinged to the dispensing cap.

* * * * *